(12) United States Patent
Kano

(10) Patent No.: US 7,852,752 B2
(45) Date of Patent: Dec. 14, 2010

(54) METHOD AND APPARATUS FOR DESIGNING BACKUP COMMUNICATION PATH, AND COMPUTER PRODUCT

(75) Inventor: Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1042 days.

(21) Appl. No.: 10/878,085

(22) Filed: Jun. 28, 2004

(65) Prior Publication Data

US 2005/0111350 A1 May 26, 2005

(30) Foreign Application Priority Data

Nov. 20, 2003 (JP) ............................. 2003-390969

(51) Int. Cl.
*H04J 1/00* (2006.01)
(52) U.S. Cl. ...................................... 370/221; 370/225
(58) Field of Classification Search .......... 370/216–228
See application file for complete search history.

(56) References Cited

U.S. PATENT DOCUMENTS

| | | | | |
|---|---|---|---|---|
| 6,490,245 | B2 * | 12/2002 | Burns et al. .................. | 370/216 |
| 6,674,713 | B1 * | 1/2004 | Berg et al. ................... | 370/217 |
| 6,934,249 | B1 * | 8/2005 | Bertin et al. ................. | 370/218 |
| 7,012,888 | B2 * | 3/2006 | Schoeneberger et al. .... | 370/217 |
| 7,197,008 | B1 * | 3/2007 | Shabtay et al. .............. | 370/218 |
| 2002/0131362 | A1 * | 9/2002 | Callon ......................... | 370/216 |
| 2003/0063613 | A1 * | 4/2003 | Carpini et al. ............... | 370/216 |
| 2004/0071085 | A1 * | 4/2004 | Shaham et al. .............. | 370/230 |
| 2004/0190441 | A1 * | 9/2004 | Alfakih et al. ............... | 370/216 |
| 2004/0190444 | A1 * | 9/2004 | Trudel et al. ................ | 370/224 |
| 2004/0208118 | A1 * | 10/2004 | DeBoer et al. .............. | 370/223 |
| 2005/0013242 | A1 * | 1/2005 | Chen et al. .................. | 370/228 |

FOREIGN PATENT DOCUMENTS

JP 2002-281068 9/2002

OTHER PUBLICATIONS

Notice of Rejection mailed Jul. 8, 2008, from the corresponding Japanese Application.
Norihiko Shinomiya, et al. "TMWS2001-18 A Study on Restorable Photonic Network Design with Flooding Time Constraints for Failure Notification" The Third Telecommunicaton Management Workshop, Mar. 2001.
Shinya Kano, et al. Path Computation Algorithm for Fast Recovery in Optical Networks. The Institute of Electronics Information and Communication Engineers. May 22, 2003.
R. Rabbat, et al. Optical Network Failure Recovery Requirements. CCAMP Working Group. Jun. 2003.
Richard Rabbat et al. Fault Notification Protocol for GMPLS-Based Recovery. CCAMP Working Group. Jun. 2003.

(Continued)

*Primary Examiner*—Ricky Ngo
*Assistant Examiner*—Pao Sinkantarakorn
(74) *Attorney, Agent, or Firm*—Katten Muchin Rosenman LLP

(57) ABSTRACT

A communication node selecting unit selects a communication node where a time for transferring a failure notification message from a plurality of failure detected communication nodes which detect a plurality of failures on an active communication path to be protected is within a predetermined time, and a backup communication path designing unit searches, based on the selected communication nodes, for a common backup communication path which bypasses the failures.

21 Claims, 21 Drawing Sheets

OTHER PUBLICATIONS

J.P. Lang et al. RSVP-TE Extensions in Support of End-to-End GMPLS-based Recovery. CCAMP Working Group. May 2003.

Ping Pan et al. Fast Reroute Extensions to RSVP-TE for LSP Tunnels. Jul. 2, 2003.

T. Souyima et al. Extensions to LMP for Flooding-based Fault Notification . CCAMP Working Group. Jun. 2003.

Yasuki Fujii, et al. A Study on Path Restoration Method Based on Pre-planned Configuration. The Institute of Electronics, Information and Communication Engineers. Nov. 2000.

\* cited by examiner

| COMMUNICATION LINK | COMMUNICATION NODE 1 | COMMUNICATION NODE 2 | LENGTH (km) |
|---|---|---|---|
| L1 | N1 | N2 | 331 |
| L2 | N3 | N5 | 185 |
| ... | ... | ... | ... |
| Lx | N10 | N12 | 169 |

FIG.4

| ACTIVE COMMUNI-CATION PATH | START COMMUNI-CATION NODE | END COMMUNI-CATION NODE | ROUTED COMMUNICATION NODE SERIES | NUMBER OF CHANNELS |
|---|---|---|---|---|
| P1 | N1 | N2 | N3 | 1 |
| P2 | N2 | N5 | N1,N3,N6 | 2 |
| ... | ... | ... | ... | ... |
| Px | N10 | N13 | N9,N6,N3,N2,N1 | 1 |

FIG.5

| FAILURE PORTION | FAILED ACTIVE COMMUNICATION PATH (COMMUNICATION NODE SERIES) | BACKUP COMMUNICATION PATH (COMMUNICATION NODE SERIES) | FAILURE DETECTED COMMUNI-CATION NODE |
|---|---|---|---|
| L1 (BETWEEN N1-N2) | P1 (N1,N3,N2) | SP1 (N1,N4,N5,N2) | N2 |
| | P2 (N2,N1,N3,N6,N5) | SP2 (N2,N4,N7,N8,N5) | N1 |
| | P3 (N1,N2,N3,N9) | SP3 (N1,N5,N6,N9) | N2 |
| L2 (BETWEEN N3-N5) | ... | ... | ... |
| ... | ... | ... | ... |

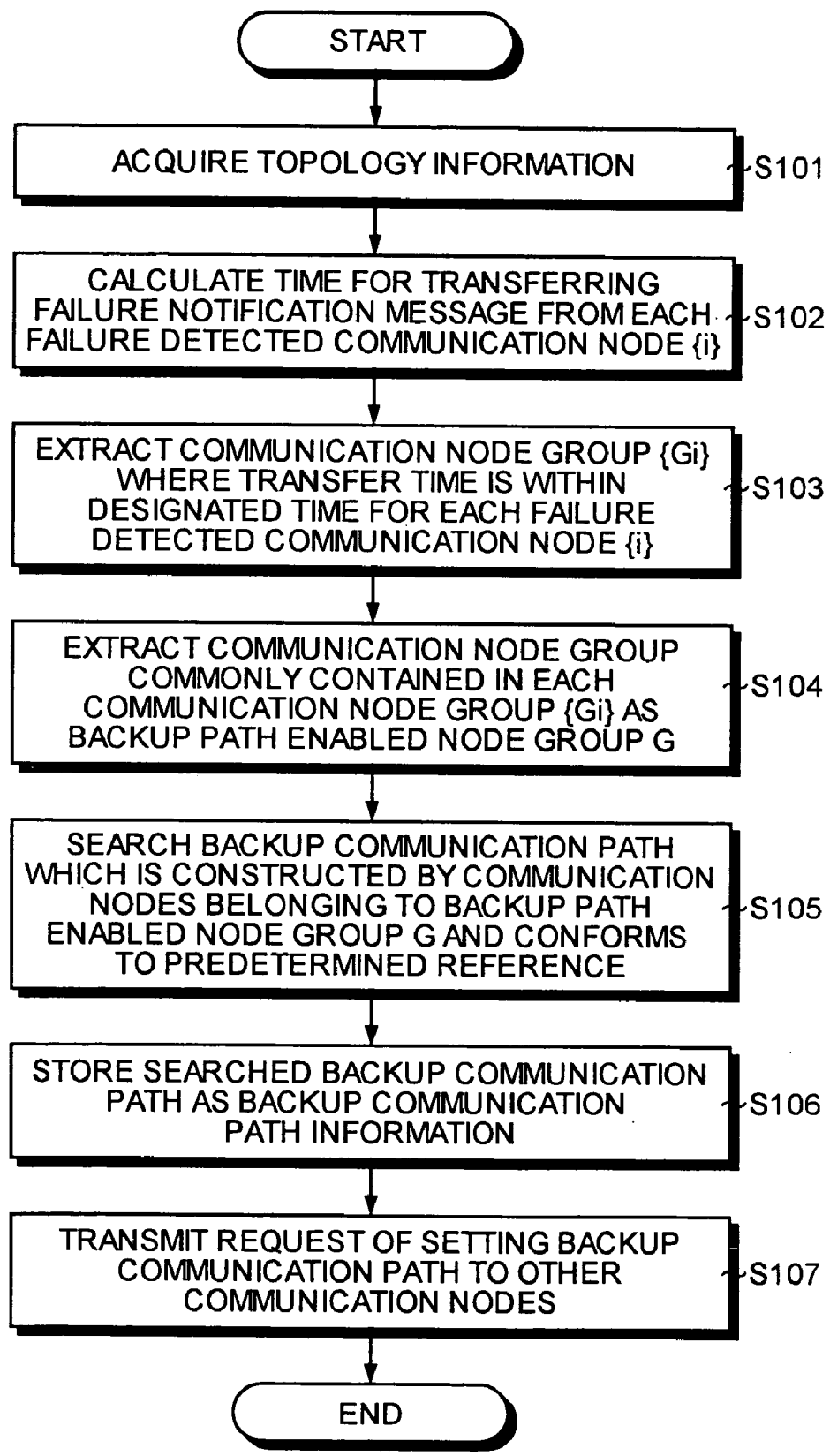

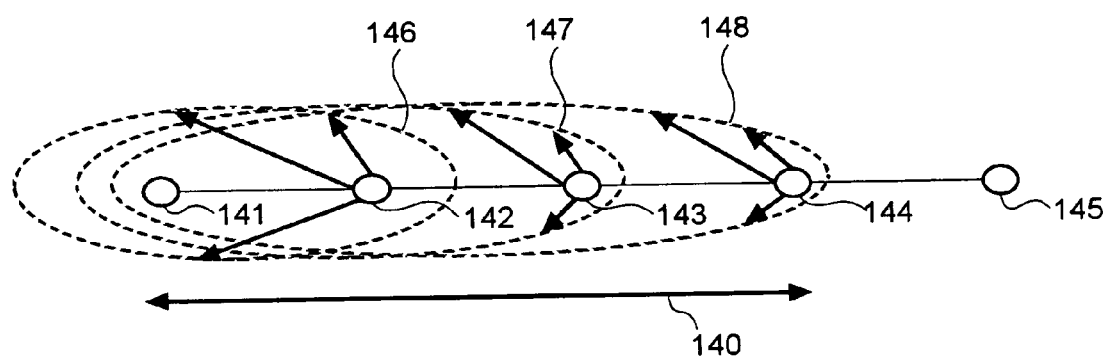
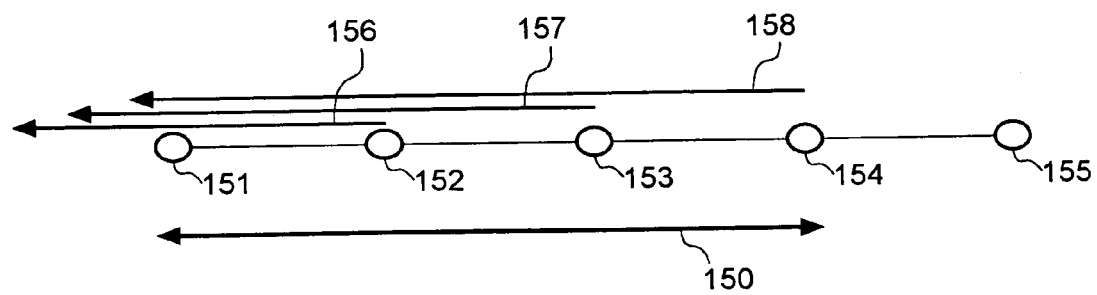

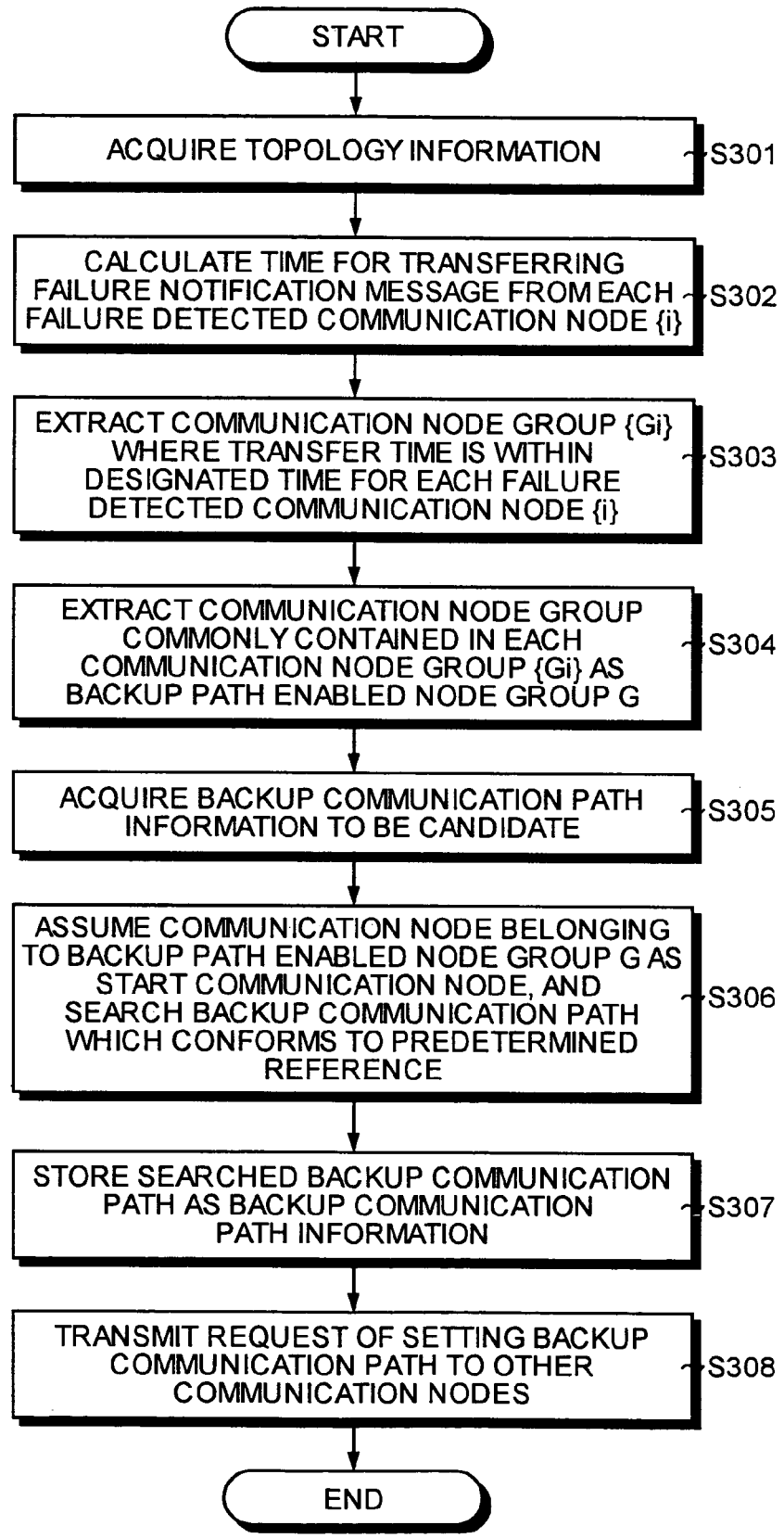

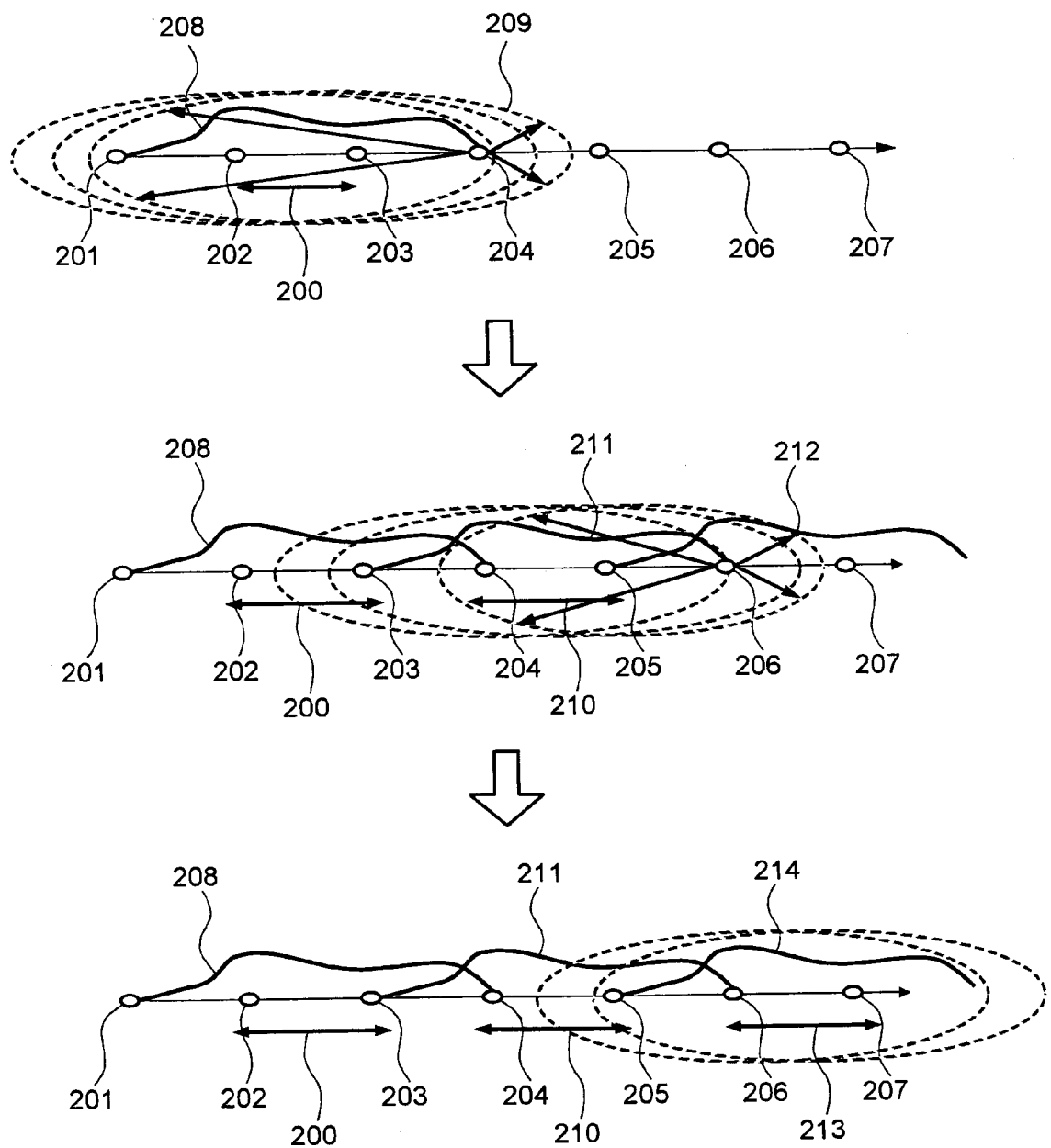

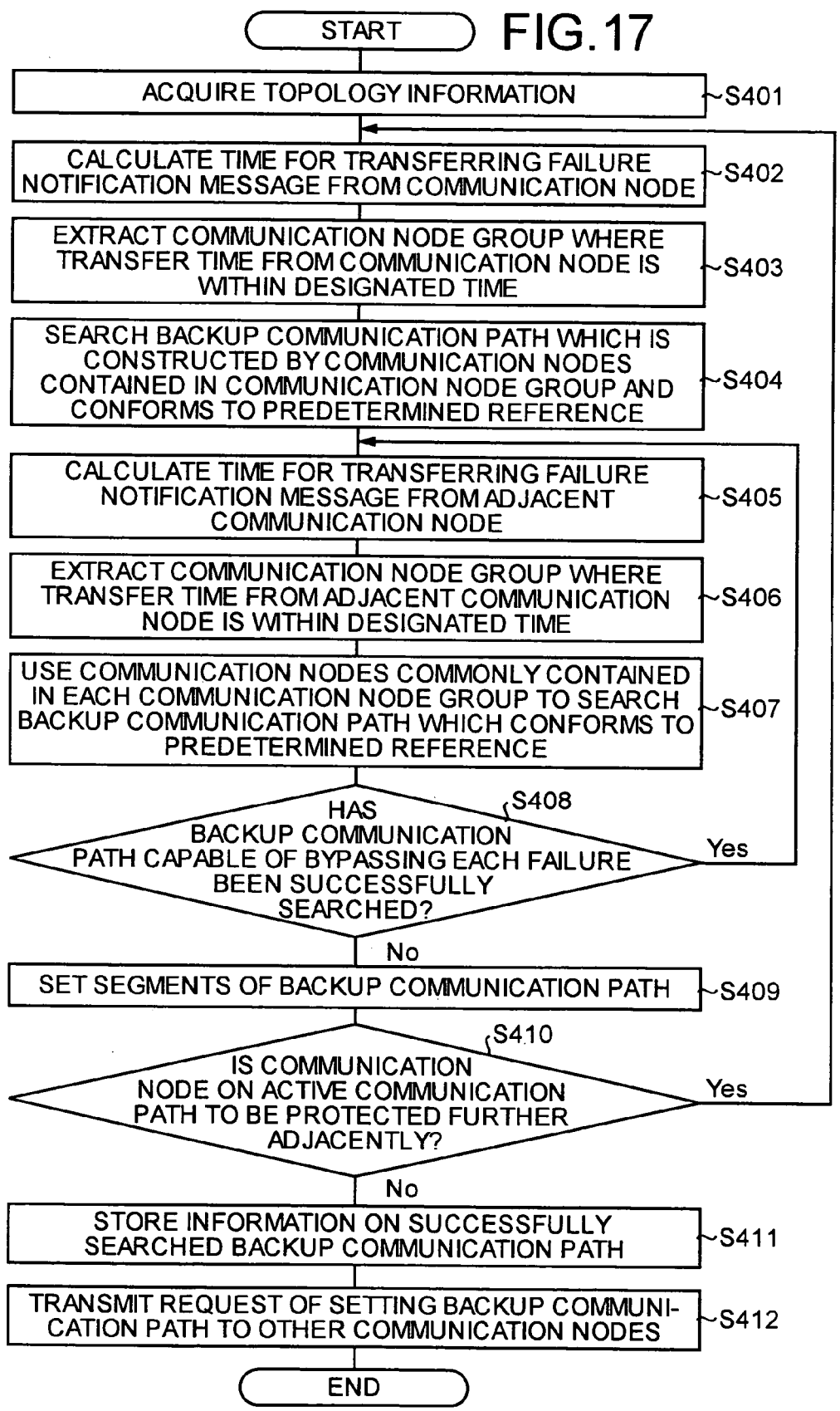

METHOD AND APPARATUS FOR DESIGNING BACKUP COMMUNICATION PATH, AND COMPUTER PRODUCT

BACKGROUND OF THE INVENTION

1) Field of the Invention

The present invention relates to a technology for deciding a backup communication path in a communication network to take care of one or more failures in the link or the communication nodes.

2) Description of the Related Art

The communication traffics in the backbone networks is dramatically increasing along with upcoming of various new services and demands and wide spreading of the Internet. As a result, large capacity and high speed backbone networks are being designed based on the WDM (Wavelength Division Multiplexing) technique.

The OXC (Optical Cross Connect) and the OADM (Optical Add-Drop Multiplexer) are being developed further for efficient operations by flexible control of mesh type network and sharing of preliminary wavelength, and construction of a new communication infrastructure and introduction of services are expected.

If there is failure in a large capacity WDM network, the damage increase with the number of services being provided by the system. Thus, it is an object to develop a high degree management system capable of enhancing reliability of the network. Particularly, a technique of recovering services at high speed from a link failure or communication node failure by optical layer is made important.

The present inventors are doing research on preplan type failure recovery system which realizes high-speed failure recovery in the WDM network (see "Study on preplan type failure recovery system" Yasuki Fujii, Keiji Miyazaki, Kohhei Iseda, Shingakugihou TM2000-60, pp. 67-72, November 2000). In the preplan type failure recovery system, failure information is sequentially notified from a communication node which has detected the failure to adjacent communication nodes with respect to communication nodes where backup communication path information is previously registered (it is called flooding) so that each communication node set up a communication path in parallel according to the set backup communication path information. Thus, time taken for dynamically searching a backup communication path can be reduced and fast service recovery can be expected.

However, even if the communication path can be switched in parallel, if a longer time is taken until a communication node on the backup communication path receives a failure notification, fast service recovery cannot be realized.

FIG. 24 is a diagram to explain such a preplan type failure recovery system. FIG. 24 explains a network based on an optical path which transmits/receives an optical signal between terminals, particularly a network where the WDM technique is employed to multiplex a plurality of optical signals in an optical fiber and the OXC (Optical Cross Connect) is used for relaying.

FIG. 24 represents a case in which communication is preformed on an active communication path 3 between a communication node 1 and a communication node 2. Each communication node is constructed by an optical cross connect as an optical switch. The communication path 3 has communication nodes 17, 10, 12, and 14. Assuming that a failure 11 occurs between the communication nodes 10 and 12, the downstream communication node 12 detects the failure.

The optical cross connect comprises a function of switching a connection state between a port at an optical signal inputting unit side and a port at an optical signal outputting unit side by adjusting an angle of an incorporated mirror (not shown).

The communication node 12, which has detected the failure, transfers a failure notification message 13 containing failure portion information to a communication node 14, and the communication node 14 further notifies it to an adjacent communication node 15, so that the message is sequentially notified to adjacent communication nodes (flooding).

The communication nodes 15 and 16 on the backup communication path and the communication nodes 14 and 17 that switch the communication path transfer a failure notification message to all the adjacent communication nodes except the communication node that has received it only when the failure notification message is received for the first time. Then, the communication path is switched from the active communication path 3 to a backup communication path 4 according to the previously registered backup communication path information.

The communication nodes 15 and 16 on the backup communication path on the set backup communication path or the communication nodes 14 and 17 that switch the communication path are far away from the failure detected communication node 12 and it takes much time to receive the failure notification message, which largely causes delay of the communication path recovery.

Conventionally, previously searched for is a backup communication path where a time for transferring a failure notification message to all the communication node on the backup communication path from a communication node which has detected the failure does not exceed a give limit time at the time of designing the backup communication path, and the backup communication path is set in each communication node (see Japanese Patent Application Laid-Open No. 2002-281068).

FIG. 25 is a schematic to explain a conventional backup communication path design system. In FIG. 25, it is assumed that communication is performed on an active communication path of communication nodes 20, 22, and 23. For example, a time for transferring a failure notification message from a downstream communication node 22 to each communication node is calculated for a failure 21 between the communication nodes 20 and 22.

A communication node group which is present in an area 29 where the failure notification message can be transferred within the given limit time is used to search for a backup communication path. In the example shown in FIG. 25, since the failure notification message cannot be transferred to the communication nodes 26 and 28 within the limit time, the communication nodes are excluded from the communication node group to be retrieved.

In the MPLS (Multi-Protocol Label Switching) communication network which is a packet transfer technique using a label switching system, when a failure occurs in an active communication path, an upstream communication node in the communication link where the failure has occurred detects the failure occurrence and transmits a failure notification message to the downstream along the active communication path. The switching communication node which has received the failure notification message switches the communication path to the previously registered backup communication path.

FIG. 26 is a schematic of a conventional system of switching to a backup communication path in the MPLS communication network. In FIG. 26, it is assumed that communication is performed on an active communication path 37 made of communication nodes 33, 30, 32, and 34. For example, when a failure 31 occurs between the communication nodes 30 and 32, the upstream communication node 30 where the failure 31 has occurred detects the failure, and transmits a failure notification message to the communication node 33 where a backup communication path 38 is set. The communication node 33 which has received the failure notification message switches the communication path to the backup communication path 38.

Also in this case, the communication node 33 which switches the communication path is far away from the communication node 30 which has detected the failure and it takes much time to receive the failure notification message, which causes delay of the communication path recovery. But, as explained in FIG. 25, a communication node which switches the communication path is selected from the communication node group on the active communication path 37, which does not exceed the given limit time, to set the backup communication path so that the problem can be solved.

However, in the technique explained in Japanese Patent Application Laid-Open No. 2002-281068, it is possible to efficiently set a backup communication path which recovers communication within a required recovery time for a failure which occurs at one portion on a communication path, but there is a problem that the setting is difficult for a plurality of failure portions.

In other words, in the conventional technique, there is a problem that since the backup communication paths which can recover communication within a required recovery time are independently set, respectively, the communication resources are not shared between the set backup communication paths when a plurality of failure portions are assumed so that the backup communication path capable of efficiently utilizing the communication resources is difficult to set.

Therefore, how to design a backup communication path capable of recovering communication within a predetermined recovery time while restricting the communication resources when a plurality of failures are assumed is an important task.

SUMMARY OF THE INVENTION

It is an object of the present invention to solve at least the problems in the conventional technology.

A backup communication path design method according to an aspect of the present invention is a method in which backup communication path information is previously registered in each communication node of a communication network having a plurality of communication nodes, when a communication link failure or communication node failure occurs, a failure detected communication node transmits a failure notification message containing failure portion information to each communication node and a communication node which has received the failure notification message set up a communication path in parallel. The method includes selecting a communication node where a time for transferring the failure notification message from a plurality of failure detected communication nodes that detect a plurality of failures on an active communication path to be protected is within a predetermined time; and searching, using the communication nodes selected, for a common backup communication path that bypasses the failures.

A backup communication path design apparatus according to another aspect of the present invention is a device in which backup communication path information is previously registered in each communication node of a communication network having a plurality of communication nodes, when a communication link failure or communication node failure occurs, a failure detected communication node transmits a failure notification message containing failure portion information to each communication node and a communication node which has received the failure notification message set up a communication path in parallel. The apparatus includes a selecting unit that selects a communication node where a time for transferring the failure notification message from a plurality of failure detected communication nodes that detect a plurality of failures on an active communication path to be protected is within a predetermined time; and a searching unit that searches, using the communication nodes selected, a common backup communication path that bypasses the failures.

A computer program according to still another aspect of the present invention realizes the method according to the present invention on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is an example of contents of active communication path information shown in FIG. 2;

FIG. 5 is an example of contents of backup communication path information shown in FIG. 2;

FIG. 6 is a flowchart of a backup communication path design processing according to the first embodiment;

FIG. 11 is a schematic to explain a design processing of a backup communication path where switching is performed by flooding a failure notification message;

FIG. 12 is a schematic to explain a design processing of a backup communication path where switching is performed by transferring a failure notification message to upstream communication nodes;

FIG. 13 is a flowchart to explain a process procedure of a backup communication path design processing according to a third embodiment of the present invention;

FIG. 16 is a schematic to explain a segment setting processing in which communication nodes are to be protected;

FIG. 17 is a flowchart to explain a process procedure of a backup communication path design processing according to a fourth embodiment of the present invention;

DETAILED DESCRIPTION

Exemplary embodiments of a backup communication path design method, a backup communication path design apparatus, and a backup communication path design program according to the present invention will be explained below in detail with reference to the accompanying drawings.

Figure 1:
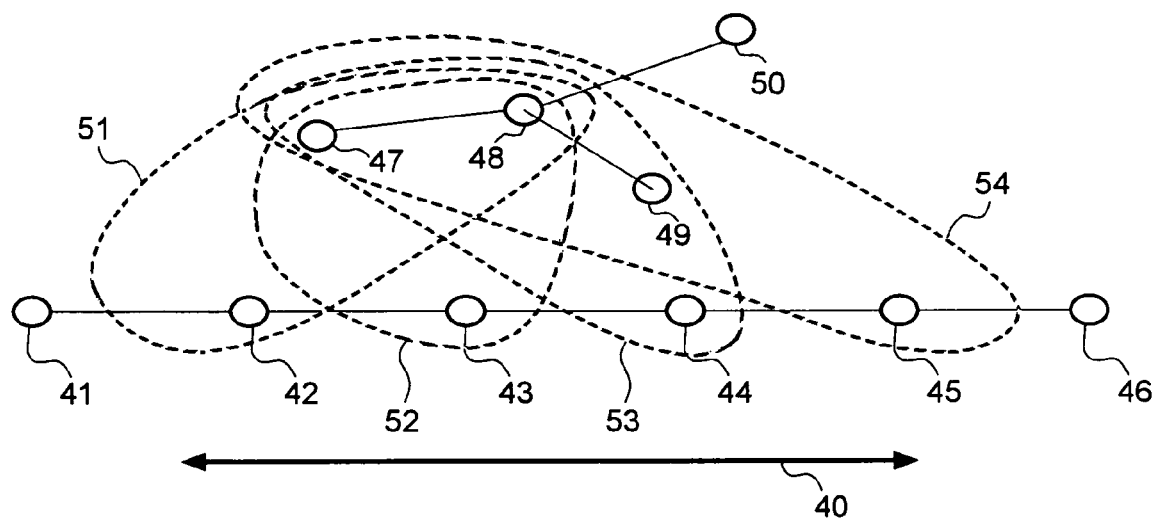
FIG. 1 is a schematic to explain a backup communication path design processing according to a first embodiment of the present invention.

FIG. 1 is a schematic to explain a backup communication path design processing according to a first embodiment of the present invention. As explained in FIG. 1, in the backup communication path design processing, communication nodes 47 and 48 where a time for transferring a failure notification message from a plurality of failure detected communication nodes 42, 43, 44, and 45 which detect a plurality of failures on an active communication path 40 to be protected is within a predetermined time are selected, and the selected communication nodes 47 and 48 are used to search for a backup communication path common to each failure which bypasses the failures.

The failure means a failure in a communication link or in a communication node. When a failure occurs in the communication link, a communication node connected to the communication link transmits a failure notification message.

When a failure occurs in the communication node, the communication node where the failure has occurred transmits a failure notification message, or when it is impossible, a communication node adjacent to the communication node where the failure has occurred transmits a failure notification message. Hereinafter, there will be explained a case where when a failure occurs in the communication node of the active communication path, a communication node downstream the failure detects the failure and transmits a failure notification message.

In the backup communication path design processing, specifically, failure notification areas 51 to 54 containing communication nodes where a time for transferring a failure notification message from each failure detected communication node 42 to 45 on the active communication path 40 is within a predetermined time are obtained for each failure detected communication node 42 to 45.

The communication nodes 47 and 48 commonly contained in each failure notification area 51 to 54 are extracted, and the extracted communication nodes 47 and 48 are used to design a common backup communication path which bypasses a plurality of failures which have occurred on the active communication path 40 to be protected.

At that time, since a communication node 49 is outside the failure notification areas 51 and 52 respectively corresponding to the failure detected communication nodes 42 and 43, it is excluded from the communication nodes which are used to construct the backup communication path. Similarly, since a communication node 50 does not belong to any failure notification area 51 to 54, it is excluded from the communication nodes which are used to construct the backup communication path.

The time for transferring a failure notification message is calculated from a sum of a propagation delay time when the transferred failure notification message passes through the communication link and a time for which the transferred failure notification message is input/output in each communication node.

A failure recovery time required when a failure occurs is composed of a time for transferring the failure notification message and a backup communication path switching time in which each communication node which has received the failure notification message switches to the backup communication path.

Since the backup communication path switching time is a unique time depending on a communication node device, the failure recovery time is reduced by placing an upper limit on a time obtained by subtracting the backup communication path switching time from the failure recovery time, that is, the time for transferring the failure notification message.

In this manner, the common backup communication path which bypasses each failure is designed, thereby it is possible to design the backup communication path which recovers the communication within a predetermined recovery time while restricting communication resources on the failures on the communication path.

The backup communication path designing processing is performed by the management communication node that manages the backup communication path. The management communication node designs the backup communication path, and then transmits a backup communication path setting signaling message which requests information on the backup communication path and setting of the backup communication path on other communication nodes constructing the backup communication path.

Figures 2, 3:
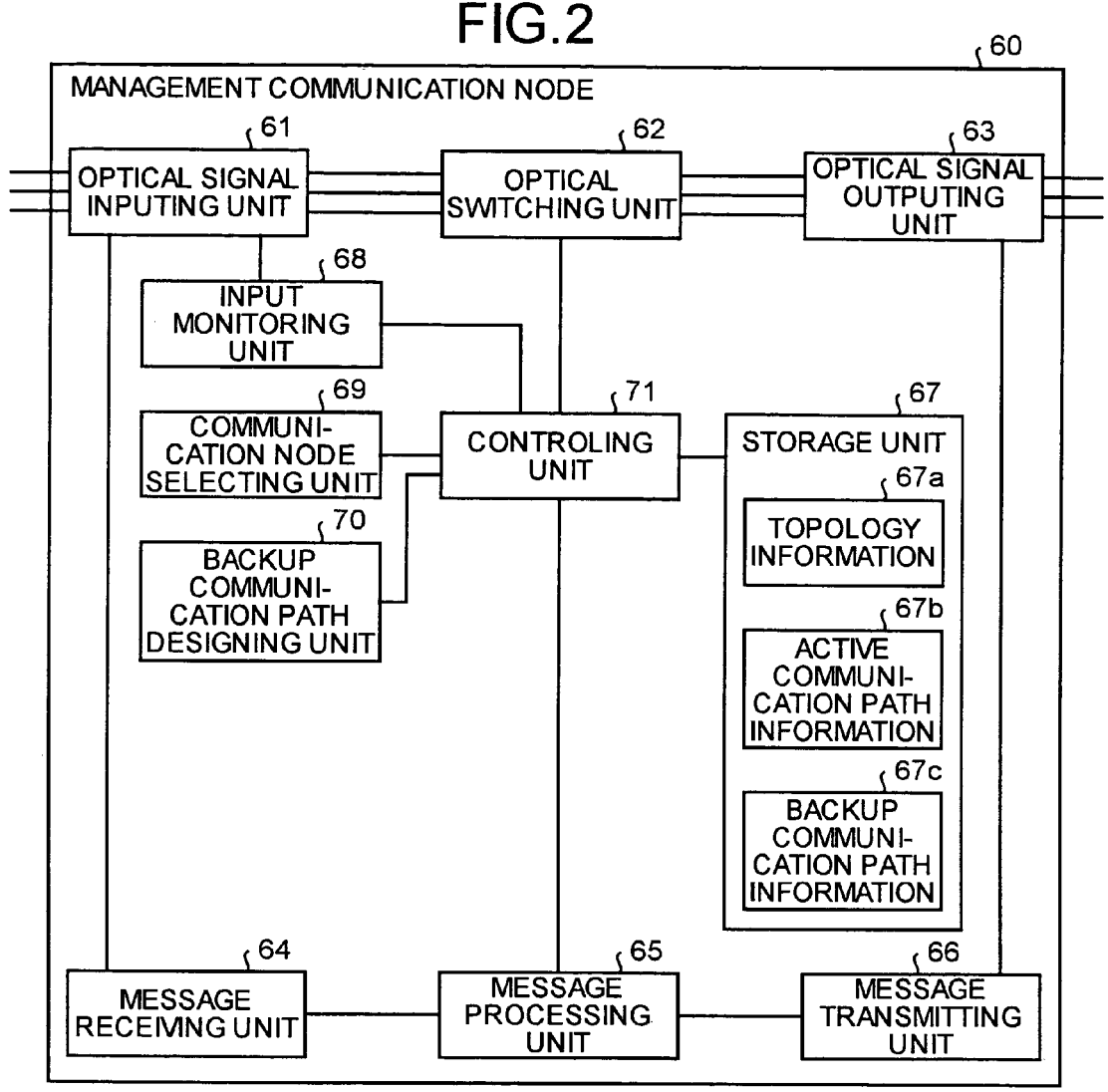
FIG. 2 is a functional block diagram of a management communication node according to the first embodiment.
FIG. 3 is an example of contents of topology information shown in FIG. 2.

A functional structure of the management communication node according to the first embodiment will be now explained. FIG. 2 is a functional block diagram of a management communication node 60 according to the first embodiment. As explained in FIG. 2, the management communication node 60 has an optical signal inputting unit 61, an optical switching unit 62, an optical signal outputting unit 63, a message receiving unit 64, a message processing unit 65, a message transmitting unit 66, a storage unit 67, an input monitoring unit 68, a communication node selecting unit 69, a backup communication path designing unit 70, and a controlling unit 71.

The optical signal inputting unit 61 is a receiving unit that receives an optical signal from an adjacent upstream communication node, and the optical signal outputting unit 63 is an outputting unit that outputs the received optical signal to an adjacent downstream communication node. The optical switching unit 62 is a switching unit that performs switching to the backup communication path when a failure occurs on the active communication path and the switching to the backup communication path is required in the communication node.

A plurality of communication links are connected to the optical signal inputting unit 61 and the optical signal outputting unit 63, respectively, and one of the communication links is selected by the optical switching unit 62 to transmit/receive various data.

The message receiving unit 64 is a receiving unit that receives a failure notification message transmitted from an adjacent communication node. The failure notification message contains failure portion information for specifying a link where the failure has occurred.

The massage processing unit 65 is a processing unit that holds the failure notification message received by the message receiving unit 64. When the same failure notification message is transmitted from different communication nodes, respectively, the message processing unit 65 holds only the first received failure notification message.

The message processing unit 65 retrieves the held failure notification messages, and determines whether or not the failure notification message newly received by the message receiving unit 64 is overlapped with the already-received failure notification message. In other words, the message processing unit 65 determines whether or not the failure notification message received in the message receiving unit 64 is the new failure notification message.

When the failure notification message received in the message receiving unit 64 is the new failure notification message, the message processing unit 65 issues an instruction of transmitting the failure notification message to the message transmitting unit 66. The message transmitting unit 66 transmits the failure notification message to the adjacent communication nodes based on the instruction from the message processing unit 65.

The message processing unit 65 issues the instruction to the message transmitting unit 66, and then refers to backup communication path information 67c stored in the storage unit 67 described later and issues an instruction of switching the communication path from the active communication path to the backup communication path to the optical switching unit 62.

When the input monitoring unit 68 detects a failure in the communication link connected to the optical signal inputting unit 61, the message processing unit 65 creates a failure notification message containing information on the failure on the communication link basis and the failure detected communication node (self-communication node), and causes the message transmitting unit 66 to transmit the created failure notification message. The failure notification message is notified to other communication nodes by flooding.

When the backup communication path is designed by the backup communication path designing unit 70, the message processing unit 65 performs backup communication path setting signaling for transmitting the backup communication path information and a request signal for setting the backup communication path based on the information with respect to the communication nodes which belong to the backup communication path. A protocol such as RSVP-TE (Resource reSerVation Protocol with Traffic Engineering) is used for the backup communication path setting signaling.

The message processing unit 65 transmits a message for requesting to transmit topology information to the other communication nodes via the message transmitting unit 66, and acquires the correspondingly transmitted topology information and stores it in the storage unit 67 as the topology information 67a. A protocol such as OSPF (Open Shortest Path First) is used for the information collecting.

The storage unit 67 is a storage device capable of storing various information, and stores the topology information 67a, active communication path information 67b, and backup communication path information 67c. The topology information 67a is information indicating topology of the optical communication network where the backup communication path is to be designed.

FIG. 3 is a diagram to explain one example of the topology information 67a shown in FIG. 2. The topology information 67a is information collected by the message processing unit 66 or information where user inputted information is stored.

As explained in FIG. 3, the topology information 67a is information on the communication link which connects the communication nodes constructing the optical communication network, and contains information on the communication link, one communication node connected through the communication link, the other communication node connected through the communication link, and a length of the communication link.

Returning to FIG. 2, the active communication path information 67b is information on the active communication path set on the optical communication network. FIG. 4 is a diagram to explain one example of the active communication path information 67b shown in FIG. 2. As explained in FIG. 4, the active communication path information 67b is composed of information on the active communication path, the start communication node of the active communication path, the end communication node of the active communication path, a routed communication node series present between the start communication node and the end communication node, and the number of channels.

Returning to FIG. 2, the backup communication path information 67c is information on the backup communication path for switching from the active communication path when a failure occurs. FIG. 5 is a diagram to explain one example of the backup communication path information 67c shown in FIG. 2. As explained in FIG. 5, the backup communication path information 67c contains information on the failure portion, the failed active communication path, the backup communication path, and the failure detected communication node.

The failure portion means that a portion where a failure occurs in the optical communication network is indicated by the communication link (between communication node-communication node). For example, a communication link L1 (between N1-N2) indicates that a failure has occurred in the communication link L1 between the communication node N1 and the communication node N2.

The failed active communication path means that the active communication path containing the failure potion is indicated by a communication node series. For example, P1 (N1, N2) indicates the failed active communication path where the communication node N1 is the start point and the communication node N2 is the end point.

The backup communication path is a communication path which is previously determined so as to correspond to the failed active communication path on one-to-one basis and which is a switch destination when a failure occurs. The backup communication path is indicated by the communication node series. For example, SP1 (N1, N4, N5, N2) indicates the backup communication path where the communication node N1 is the start point, the communication node 4 and the communication node 5 are routed, and the communication node N2 is the end point.

The failure detected communication node is a communication node which is positioned downstream with respect to the failure which has occurred on the active communication path and detects the failure by disconnection (disable reception) of the optical signal.

In the example, when a failure occurs in the link L1 on the failed active communication path P1, the failure is detected in the communication node N2, and then the failure notification message is transmitted. Each communication node which has received the failure notification message refers to the backup communication path information 67c, and switches the communication path from the failed active communication path P1 to the backup communication path SP1.

Returning to FIG. 2, the input monitoring unit 68 is a monitoring unit that monitors a state of an optical signal input into the optical signal inputting unit 61. When a failure occurs in the communication link connected to the optical signal inputting unit 61, that is, when an error occurs due to disconnection of the optical signal or the like, the input monitoring unit 68 makes a request to the message processing unit 65 to transmit a failure notification message.

As explained in FIG. 1, the communication node selecting unit 69 is a selecting unit that selects a communication node where the time for transferring the failure notification message from a plurality of failure detected communication nodes on the active communication path to be protected, which detect the failures, is within a predetermined time.

The time for transferring the failure notification message is calculated by assuming the sum of the propagation delay time when the transferred failure notification message passes through the communication link and the time for which the transferred failure notification message is input/output in each communication node as the communication cost, and using a communication path search algorithm represented by Dijkstra or the like.

The backup communication path designing unit 70 is a designing unit that uses communication nodes selected by the communication node selecting unit 69 to design the common backup communication path which bypasses a plurality of failures when the failures occur.

Specifically, the backup communication path designing unit 70 designs the backup communication path whose bypass distance is the minimum by assuming a distance of the communication link as a cost and using the communication path search algorithm represented by Dijkstra or the like.

Alternatively, the backup communication path designing unit 70 designs the backup communication path whose additional preliminary communication capacity is the minimum. The preliminary communication capacity is a communication capacity which has been reserved for the bypass communication. Even when a plurality of backup communication paths are set for one communication link, since the backup communication paths are remarkably rare used at the same time, the capacity of the backup communication path which consumes the communication capacity most is only saved.

The backup communication path designing unit 70 may design the backup communication path whose distance between the start communication node and the end communication node on the active communication path is maximum or minimum.

Specifically, the backup communication path designing unit 70 designs the backup communication path whose additional preliminary communication capacity is the minimum by setting the additional preliminary communication capacity obtained by subtracting the preliminary communication capacity already reserved by the other backup communication path from the preliminary communication capacity required for setting a new backup communication path as the cost of each communication link, and applying the communication path search algorithm represented by Dijkstra or the like.

Which of the design references is employed is previously determined. The backup communication path designing unit 70 stores information on the designed backup communication path in the storage unit 67 as the backup communication path information 67c.

After the design of the backup communication path has been completed, the backup communication path designing unit 70 instructs the message processing unit 65 to perform backup communication path setting signaling on the communication nodes which belong to the backup communication path.

The controlling unit 72 is a controlling unit that performs the entire control of the management communication node 60 and controls transmission/reception of various data between the respective functioning units.

The functional structure of the management communication node 60 that designs the backup communication path has been explained, but the functional structure of other communication node may employ a functioning unit that designs the backup communication path from the functioning unit of the management communication node 60, that is, a functioning unit where the communication node selecting unit 69 and the backup communication path designing unit 70 are excluded.

The message processing unit of the other communication node has a function of, when the backup communication path setting signaling is received from other communication node, setting the backup communication path on the self-communication node and performing the backup communication path setting signaling on the adjacent communication nodes which belong to the backup communication path.

A process procedure of the backup communication path design processing according to the first embodiment will be explained. FIG. 6 is a flowchart to explain the process procedure of the backup communication path design processing according to the first embodiment. As explained in FIG. 6, the communication node selecting unit 69 first acquires the topology information 67a stored in the storage unit 67 (step S101), and calculates a time for transferring a failure notification message from a failure portion {i} in each communication link on the active communication path to be protected (step S102).

The communication node selecting unit 69 extracts a communication node group {Gi} where the transfer time is within a designed time for each failure portion {i} (step S103), and further extracts a communication node group commonly contained in each extracted node group {i} as a backup path enabled node group G (step S104).

Thereafter, the backup communication path designing unit 70 searches for the backup communication path which is constructed by the communication nodes belonging to the backup path enabled node group G and conforms to a predetermined reference (step S105). The predetermined reference means a backup communication path design reference such as a minimum bypass distance, a minimum preliminary communication capacity, a maximum distance between the start and end communication nodes, or a minimum distance between the start and end communication nodes.

The backup communication path designing unit 70 stores the searched backup communication path in the backup communication path information 67c (step S106), and the message processing unit 65 transmits a request of setting the backup communication path to other communication nodes (step S107), and the backup communication path setting processing is terminated.

As explained above, according to the first embodiment, the communication node selecting unit 69 selects the communication node where the time for transferring a failure notification message from a plurality of failure detected communication nodes which detect the failures on the active communication path to be protected is within a predetermined time, and the backup communication path designing unit 70 uses the selected communication nodes to search for the common backup communication path which bypasses a plurality of failures when the failures occur. Thus, it is possible to design the backup communication path which recovers the communication within a predetermined recovery time while restricting the communication resources with respect to the failures on the communication path.

According to the first embodiment, the communication node selecting unit 69 calculates the time for transferring the failure notification message based on the propagation delay time when the transferred failure notification message passes through the communication link and the time for which the transferred failure notification message is input/output in each communication node. Thus, the required recovery time can be accurately calculated.

According to the first embodiment, the backup communication path designing unit 70 uses the communication nodes selected by the communication node selecting unit 69 to search for the backup communication path whose distance between the start communication node and the end communication node on the active communication path is maximum. Thus, the distance of the backup communication path is made large so that the backup communication is easily shared and the communication resources can be restricted.

According to the first embodiment, the backup communication path designing unit 70 uses the communication nodes selected by the communication node selecting unit 69 to search for the backup communication path whose distance between the start communication node and the end communication node is the minimum. Thus, the distance of the backup communication path is made small so that the recovery time can be reduced.

According to the first embodiment, the backup communication path designing unit 70 searches for the backup communication path whose bypass distance is the minimum. Thus, the propagation delay of a signal due to increase in the communication distance can be restricted.

According to the first embodiment, the backup communication path designing unit 70 searches for the backup communication path whose preliminary communication capacity reserved for failure bypassing is the minimum. Thus, the backup communication path whose communication resources are restricted can be designed.

According to the first embodiment, the message processing unit 65 transmits a request signal for requesting to set the backup communication path in the communication nodes contained in the backup communication path based on the information on the backup communication path searched by the backup communication path designing unit 70, and performs the path setting signaling which requests to transfer the request signal to the adjacent communication nodes of the communication node. Thus, the communication node 60 can design the backup communication path to set the backup communication path on the other communication nodes.

Although the backup communication path capable of recovering the communication within the predetermined recovery time is designed when the communication node downstream a failure portion detects the failure according to the first embodiment, when each communication link makes bidirectional communication, the backup communication path capable of recovering the communication within the predetermined recovery time may be designed when any one of the communication nodes across the failure portion detects the failure.

In a second embodiment of the present invention, there will be explained a case where when a failure is detected in any one of communication nodes across the failure in the bidirectional communication, a backup communication path which recovers the communication within a predetermined recovery time is designed.

Figure 7:
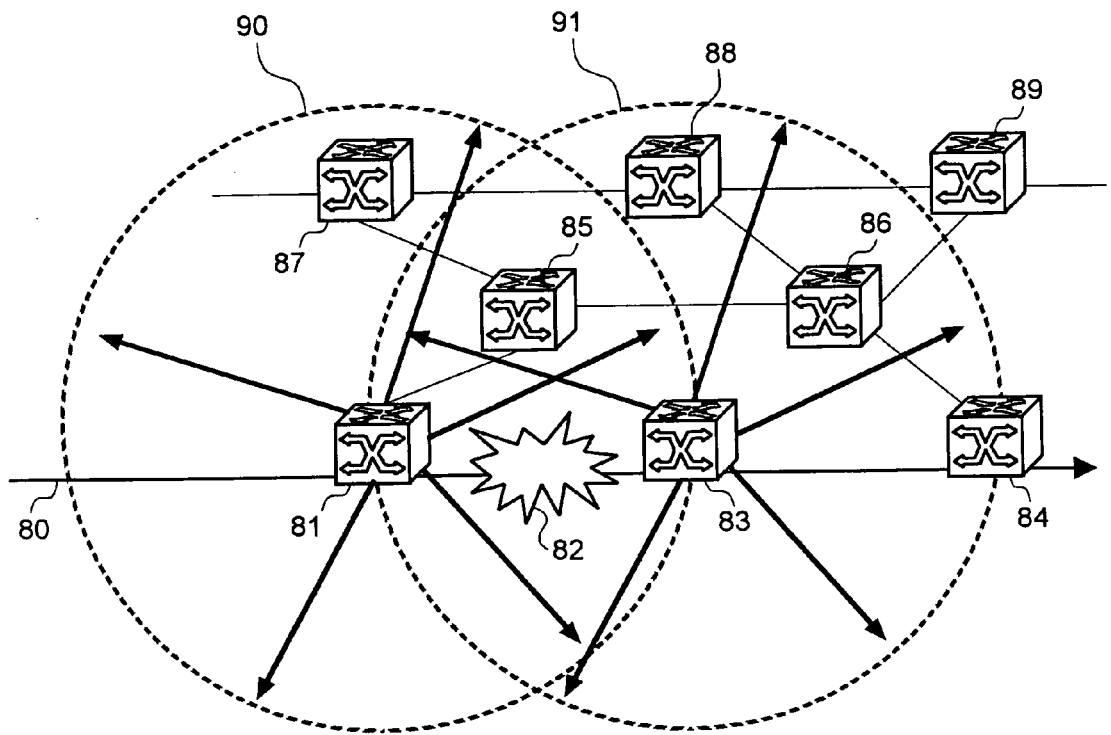
FIG. 7 is a schematic to explain a failure notification area to which a failure notification message is transmitted from two adjacent communication nodes.

First, a backup communication path design processing according to the second embodiment will be explained. FIG. 7 is a schematic to explain a failure notification area to which a failure notification message is transferred from two adjacent communication nodes, and FIG. 8 is a schematic to explain the backup communication path design processing according to the second embodiment.

As explained in FIG. 7, a communication node group where the time for transferring a failure notification message from one of communication nodes 81 and 83 on an active communication path 80 that detects a failure 82 is within a predetermined time is first extracted in the backup communication path design processing.

Specifically, an area contained in either one of an area 90 where the failure notification message is transferred from the communication node 81 within the designated limit time and an area 91 where the failure notification message is transferred from the communication node 83 within the designated limit time is set as the failure notification area. This processing is performed on each communication link on the active communication path to be protected to set the failure notification area for each communication link.

Figure 8:
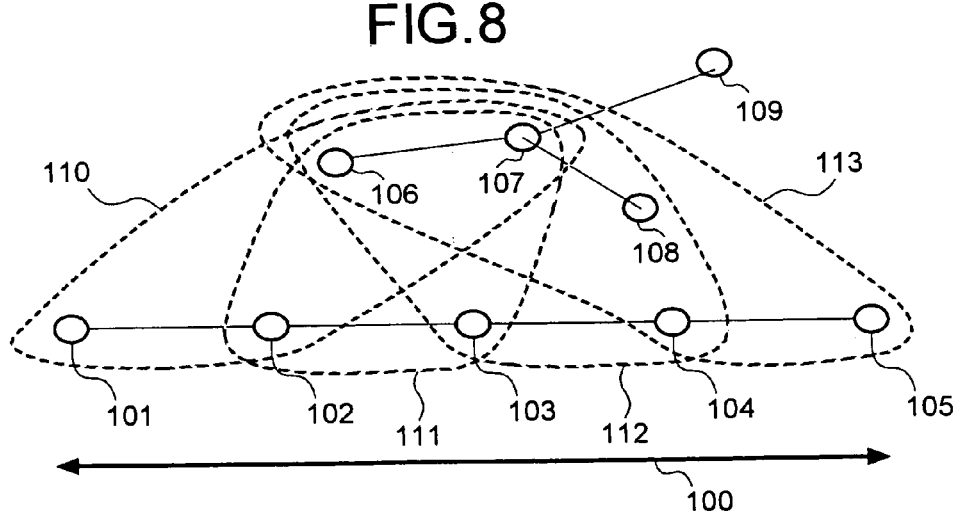
FIG. 8 is a schematic to explain a backup communication path design processing according to a second embodiment of the present invention.

As explained in FIG. 8, communication nodes 106 and 107 commonly contained in each set failure notification area are extracted, and the extracted communication nodes 106 and 107 are used to design a common backup communication path which bypasses a plurality of failures occurring on an active communication path 100 to be protected.

Since a communication node 108 is outside a failure notification area 110 corresponding to communication nodes 101 and 102 and a failure notification area 111 corresponding to communication nodes 102 and 103, it is excluded from the communication nodes used for constructing the backup communication path. Similarly, since a communication node 109 does not belong to any one of the failure notification areas 110 to 113, it is excluded from the communication nodes used for constructing the backup communication path.

Figure 9:
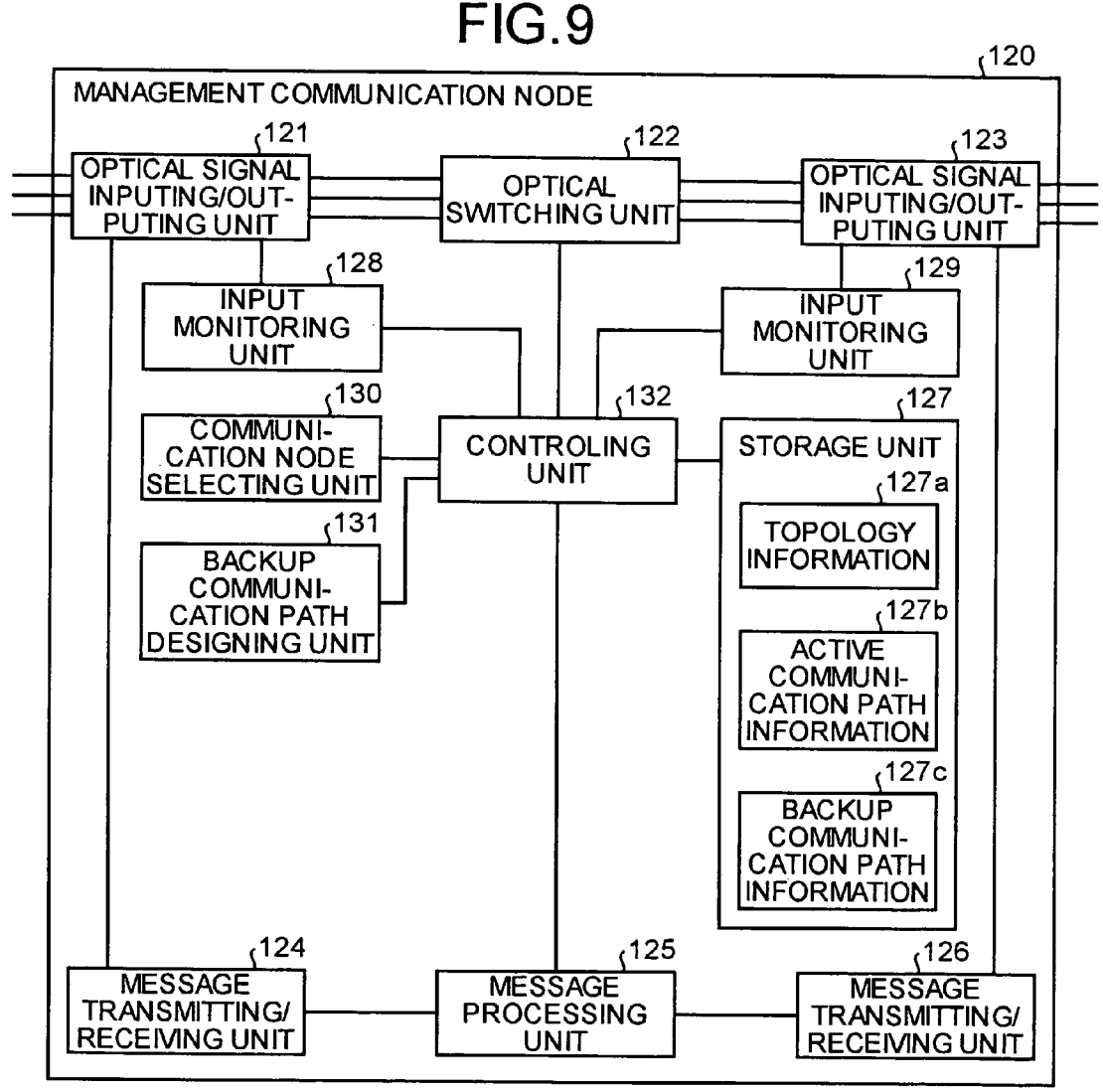
FIG. 9 is a functional block diagram of a management communication node according to the second embodiment.

A functional structure of a management communication node according to the second embodiment will be explained. FIG. 9 is a diagram to explain a functional structure or a management communication node 73 according to the second embodiment. A detailed explanation on the functioning units having the same functions as the functioning units explained in FIG. 2 will be omitted.

As explained in FIG. 9, the management communication node 120 has optical signal inputting/outputting units 121 and 123, an optical switching unit 122, message transmitting/receiving units 124 and 126, a message processing unit 125, a storage unit 127, input monitoring units 128 and 129, a communication node selecting unit 130, a backup communication path designing unit 131, and a controlling unit 132.

The optical signal inputting/outputting unit 121 is an inputting/outputting unit that receives an optical signal from an adjacent upstream communication node and outputs the optical signal received by the optical signal inputting/outputting unit 123 to an adjacent downstream communication node. The optical signal inputting/outputting unit 123 is an inputting/outputting unit that receives an optical signal from an adjacent upstream communication node and outputs the optical signal received by the optical signal inputting/outputting unit 121 to an adjacent downstream communication node.

The optical switching unit 122 is a functioning unit corresponding to the function of the optical switching unit 62 explained in FIG. 2, and is a switching unit that, when a failure occurs on the active communication path and switching to a backup communication path is required in the communication node, switches to the backup communication path.

The message transmitting/receiving units 124 and 126 are a transmitting/receiving unit that receives a failure notification message transmitted from an adjacent communication node and transmits the failure notification message to another adjacent communication node.

The message processing unit 125 is a functioning unit corresponding to the function of the message processing unit 65 explained in FIG. 2, and is a processing unit that holds the failure notification message received by the message transmitting/receiving units 124 and 126. The message processing unit 125 retrieves the held failure notification message and determines whether or not the failure notification message newly received by the message transmitting/receiving unit 124 or 126 is overlapped with the already received failure notification message. When the message is the new failure notification message, the message processing unit 125 issues an instruction of transmitting the failure notification message to the message transmitting/receiving unit 124 or 126.

The message processing unit 125 issues the instruction to the message transmitting/receiving unit 124 or 126, and then refers to backup communication path information 127c stored in the storage unit 127 and outputs an instruction of switching the communication path to the optical switching unit 122. When the input monitoring unit 128 or 129 detects a failure in the communication link connected to the optical signal inputting/outputting unit 121 or 123, the message processing unit 125 creates a failure notification message containing information on the failure on the communication link basis and the failure detected communication node (self-communication node), and causes the message transmitting/receiving unit 124 or 126 to transmit the created failure notification message.

The message processing unit 125 transmits the backup communication path information 127c designed by the backup communication path designing unit 131 to the communication nodes which belong to the backup communication path, and performs backup communication path setting signaling which requests the communication nodes to set the backup communication path based on the transmitted backup communication path information 127c.

The message processing unit 125 transmits a message for requesting other communication node to transmit the topology information via the message transmitting/receiving units 124 and 126, and acquires the correspondingly transmitted topology information and stores it in the storage unit 127 as the topology information 127a.

The storage unit 127 is a functioning unit corresponding to the function of the storage unit 67 explained in FIG. 2, and stores the topology information 127a, active communication path information 127b, and the backup communication path information 127c. The topology information 127a, the active communication path information 127b, and the backup communication path information 127c are information similar to the topology information 67a, the active communication path information 67b, and the backup communication path information 67c explained in FIGS. 3, 4, and 5.

The input monitoring units 128 and 129 are a monitoring unit that monitors a state of an optical signal input into the optical signal inputting/outputting units 121 and 123, respectively. When a failure occurs in the communication link connected to the optical signal inputting/outputting units 121 and 123, that is, when an error occurs due to disconnection of the optical signal, the input monitoring unit 128 or 129 requests the message processing unit 125 to transmit a failure notification message.

The communication node selecting unit 130 extracts the communication node group where the time for transferring a failure notification message from any one of the failure detected communication nodes that detect a single failure is within a predetermined time for each failure, and selects a communication node commonly contained in the communication node group extracted for each failure.

Specifically, as explained in FIG. 7, the failure notification area where the time for transferring a failure notification message from one of the two communication nodes that detect a failure is within a predetermined time is calculated, and a communication node group commonly contained in the calculated failure notification area is extracted for each failure.

The backup communication path designing unit 131 is a functioning unit corresponding to the function of the backup communication path designing unit 70 explained in FIG. 2, and is a designing unit that uses the communication nodes selected by the communication node selecting unit 130 to design the common backup communication path which bypasses a plurality of failures when the failures occur based on the design reference such as a minimum bypass distance, a minimum preliminary communication capacity, a maximum distance between the start and end communication nodes, or a minimum distance between the start and end communication nodes.

The controlling unit 132 is a functioning unit corresponding to the function of the controlling unit 71 explained in FIG. 2, and a controlling unit that performs the entire control of the management communication node 120 such as controlling transmission/reception of various data between the respective functioning units.

Figure 10:
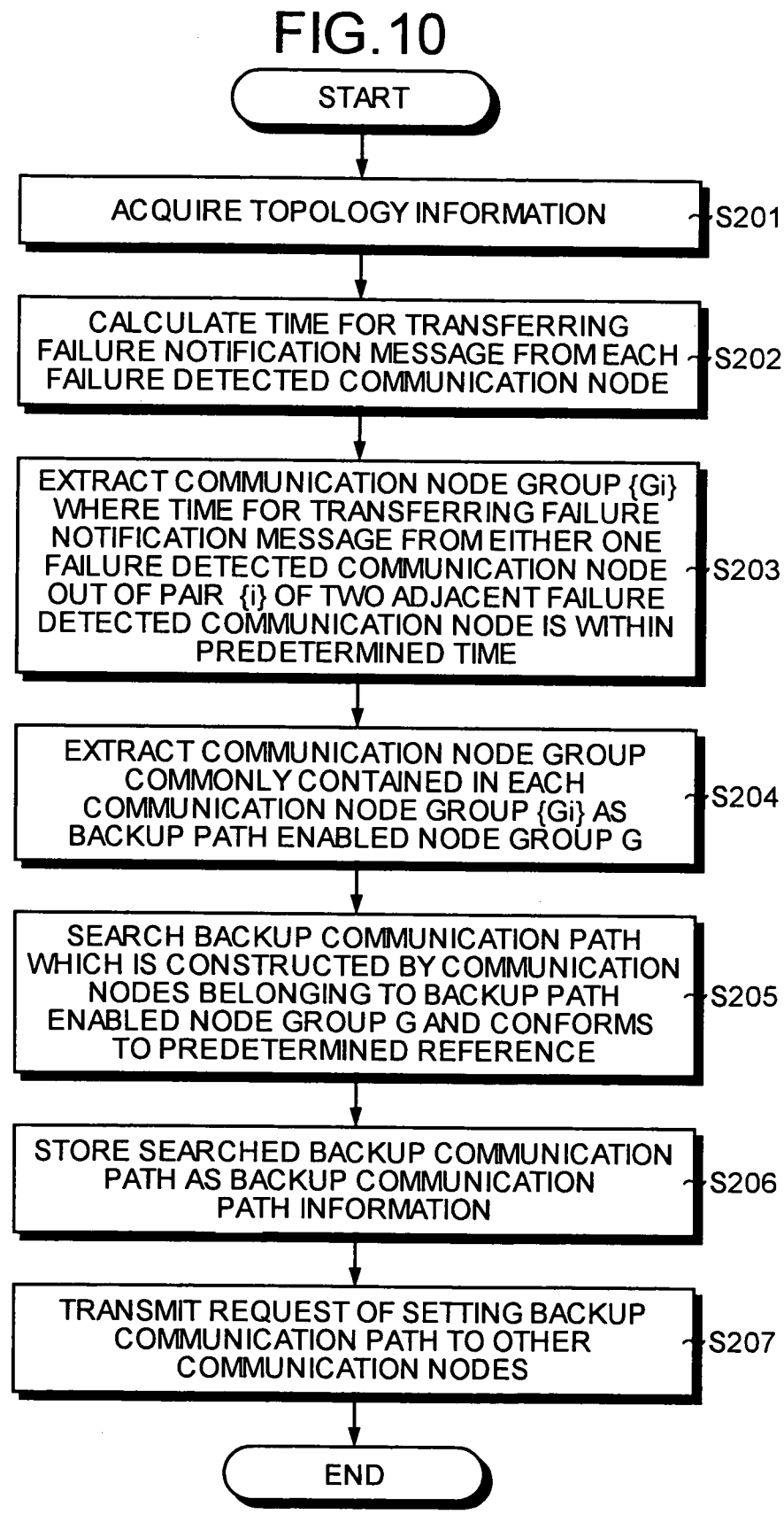
FIG. 10 is a flowchart to explain a process procedure of the backup communication path design processing according to the second embodiment.

A process procedure of the backup communication path design processing according to the second embodiment will be explained. FIG. 10 is a flowchart to explain the process procedure of the backup communication path design processing according to the second embodiment. As explained in FIG. 10, the communication node selecting unit 130 first acquires the topology information 127a stored in the storage unit 127 (step S201), and calculates the time for transferring a failure notification message from each failure detected communication node on the active communication path to be protected (step S202).

The communication node selecting unit 130 extracts the communication node group {Gi} where the time for transferring a failure notification message from either one failure detected communication node out of a pair {i} of the two adjacent failure detected communication nodes, which is connected through the communication link, is within a predetermined time for each failure detected communication node pair {i} (step S203), and extracts a communication node group commonly contained in each extracted node group {Gi} as the backup path enabled node group G (step S204).

Thereafter, the backup communication path designing unit 131 searches for the backup communication path which is constructed by the communication nodes belonging to the backup path enabled node group G and conforms to a predetermined reference (step S205). The predetermined reference is a backup communication path design reference such as a minimum bypass distance, a minimum preliminary communication capacity, a maximum distance between the start and end communication nodes, or a minimum distance between the start and end communication nodes.

The backup communication path designing unit 131 stores the searched backup communication path in the backup communication path information 127c (step S206), the message processing unit 125 transmits a request of setting the backup communication path to other communication nodes (step S207), and the backup communication path setting processing is terminated.

As explained above, according to the second embodiment, the communication node selecting unit 130 extracts the communication node where the time for transferring a failure notification message from any one of the failure detected communication nodes that detect a single failure on the active communication path to be protected is within a predetermined time for each failure, and selects the communication node commonly contained in the extracted communication node for each failure. Therefore, it is possible to design the backup communication path which recovers the communication within a predetermined recovery time while restricting the communication resources for the failures on the communication path even in the communication network composed of the communication links where bidirectional communication is performed.

In the first and the second embodiments, the backup path enabled node group capable of transferring a failure notification message within a predetermined time is extracted and the communication nodes commonly contained in the extracted backup path enabled node group are used to design the backup communication path. But in a communication network where when a switching communication node on the active communication path receives a failure notification message, the communication path is switched to the previously registered backup communication path as in the MPLS communication network, a bypass communication node assuming as the start communication node the communication node on the active communication path where the time for transferring a failure notification message from the failure detected communication node is within a predetermined time may be searched for.

In a third embodiment of the present invention, there will be explained a case where a bypass communication node is searched for that selects a communication node on the active communication path where the time for transferring a failure notification message from a failure detected communication node is within a predetermined time and assumes the selected communication node as the start communication node.

First, a backup communication path design processing according to the third embodiment will be explained. FIG. 11 is a schematic to explain the backup communication path design processing where switching is performed by flooding a failure notification message.

As explained in FIG. 11, in the backup communication path design processing, a communication node 141 where the time for transferring a failure notification message by flooding from a plurality of failure detected communication nodes 142, 143, and 144 that detect the failures on an active communication path 140 to be protected is within a predetermined time is selected, and a backup communication path which assumes the selected communication node 141 as the start communication node is searched for.

Specifically, failure notification areas 146, 147, and 148 to which the failure notification message is transferred from each of the failure detected communication nodes 142, 143, and 144 on the active communication path 140 to be protected within a designated limit time are set, and the backup communication path which assumes the communication node 141 commonly contained in each of the failure notification areas 146, 147, and 148 as the start communication node is searched for.

The candidates of the backup communication path having the start communication node on the active communication path are previously registered. The start communication node of the backup communication path is determined according to the processing so that the backup communication path to be actually used is extracted.

FIG. 12 is a schematic to explain a design processing of the backup communication path where switching is performed by transferring a failure notification message to upstream communication nodes. FIG. 11 explains the case where the failure detected communication node floods the failure notification message, but FIG. 12 explains a case where the failure notification message is transferred to the upstream communication nodes along the active communication path.

As explained in FIG. 12, a communication node 151 where the time for transferring a failure notification massage to the upstream communication nodes along the active communication path from a plurality of failure detected communication nodes 152, 153, and 154 that detect the failures on an active communication path 150 to be protected is within a predetermined time is selected, and a backup communication path which assumes the selected communication node 151 as the start communication node is searched for.

Specifically, failure notification areas 156, 157, and 158 where a failure notification message is transferred from each of the failure detected communication nodes 152, 153, and 154 on the active communication path 150 to be protected along the active communication path within a designated limit time are set and a backup communication path which assumes the communication node 151 commonly contained in each of the failure notification areas 156, 157, and 158 as the start communication node is searched for.

Similarly as in FIG. 11, the candidates of the backup communication path having the start communication node on the active communication path are previously registered, and the start communication node of the backup communication path is determined according to the processing so that the backup communication path to be actually used is extracted.

A functional structure of the management communication node according to the third embodiment is almost similar to the functional structure of the management communication node 60 according to the first embodiment shown in FIG. 2. However, the message transmitting unit according to the third embodiment transfers a failure notification message to the communication nodes on the active communication path by flooding as shown in FIG. 11. Alternatively, as shown in FIG. 12, the message transmitting unit according to the third embodiment transfers a failure notification message to the communication nodes on the active communication path along the active communication path.

The backup communication path information stored in the storage unit according to the third embodiment stores not only information on the already defined backup communication path but also information on the communication path which has the start communication node on the active communication path and which is to be a candidate of the backup communication path. The communication node selecting unit according to the third embodiment selects a communication node on the active communication path where the time for transferring a failure notification message from a plurality of failure detected communication nodes which detect the failures[K1] on the active communication path to be protected is within a predetermined time.

The backup communication path designing unit according to the third embodiment searches for the backup communication path which assumes the communication node selected by the communication node selecting unit as the start communication node from the candidates of the backup communication path previously stored in the backup communication path information.

Thereafter, in order to discriminate each of the functions from the functioning unit in FIG. 2, the numeral of the message transmitting unit according to the third embodiment is assumed as 66a, the numeral of the backup communication path information according to the third embodiment is assumed as 67c1, the numeral of the communication node selecting unit according to the third embodiment is assumed as 69a, and the numeral of the backup communication path designing unit according to the third embodiment is assumed as 70a, and an explanation based thereon will be given. The other functioning units are denoted with like numerals identical to those of the respective functioning units in FIG. 2.

A process procedure of the backup communication path design processing according to the third embodiment will be explained. FIG. 13 is a flowchart to explain the process procedure of the backup communication path design processing according to the third embodiment. As explained in FIG. 13, the communication node selecting unit 69a first acquires the topology information 67a stored in the storage unit 67 (step S301), and calculates a time for transferring a failure notification message to the failure portion {i} of each communication link on the active communication path to be protected (step S302).

The time for transferring a failure notification message is a transfer time when the failure notification message is transferred from the failure detected communication node by flooding or transferred to other communication nodes along the active communication path as explained in FIG. 11 or 12.

The communication node selecting unit 69a extracts the communication node group {Gi} where the transfer time is within a designated time for each failure portion {i} (step S303), and further extracts the communication node group commonly contained in each extracted node group {Gi} as the backup path enabled node group G (step S304).

The backup communication path designing unit 70a acquires the information on the backup communication path which is to be a candidate from the backup communication path information 67c1 (step S305), and searches for the backup communication path which assumes the communication node belonging to the backup path enabled node group G as the start communication node and conforms to a predetermined reference (step S306). The predetermined reference is a design reference such as a minimum bypass distance, a minimum preliminary communication capacity, a maximum distance between the start and end communication nodes, or a minimum distance between the start and end communication nodes.

Thereafter, the backup communication path designing unit 70a stores the searched backup communication path in the backup communication path information 67c1 (step S307), the message processing unit 65 transmits a request of setting the backup communication path to other communication nodes (step S308), and the backup communication path setting processing is terminated.

As explained above, in the third embodiment, the communication node selecting unit 69a selects the communication node on the active communication path where the time for transferring a failure notification message from a plurality of failure detected communication nodes which detect the failures on the active communication path to be protected is within a predetermined time, and the backup communication path designing unit 70a searches for the backup communication path which assumes the communication node selected by the communication node selecting unit 69a as the start communication node. Therefore, it is possible to design the backup communication path which recovers the communication within a predetermined time while restricting the communication resources for the failures on the communication path even in the backup communication path switching system such as the MPLS communication network.

The backup communication path common to each failure, which bypasses the failures on the active communication path to be protected, is designed according to the first to the third embodiments. But when one bypass communication pass cannot bypass all the failure assumed portions on the active communication path to be protected, the backup communication path may be divided into several segments to design the backup communication path which bypasses the failures for each segment. In a fourth embodiment of the present invention, there will be explained a case where the backup communication path is divided into several segments and the backup communication path which bypasses the failures for each segment is designed.

Figure 14:
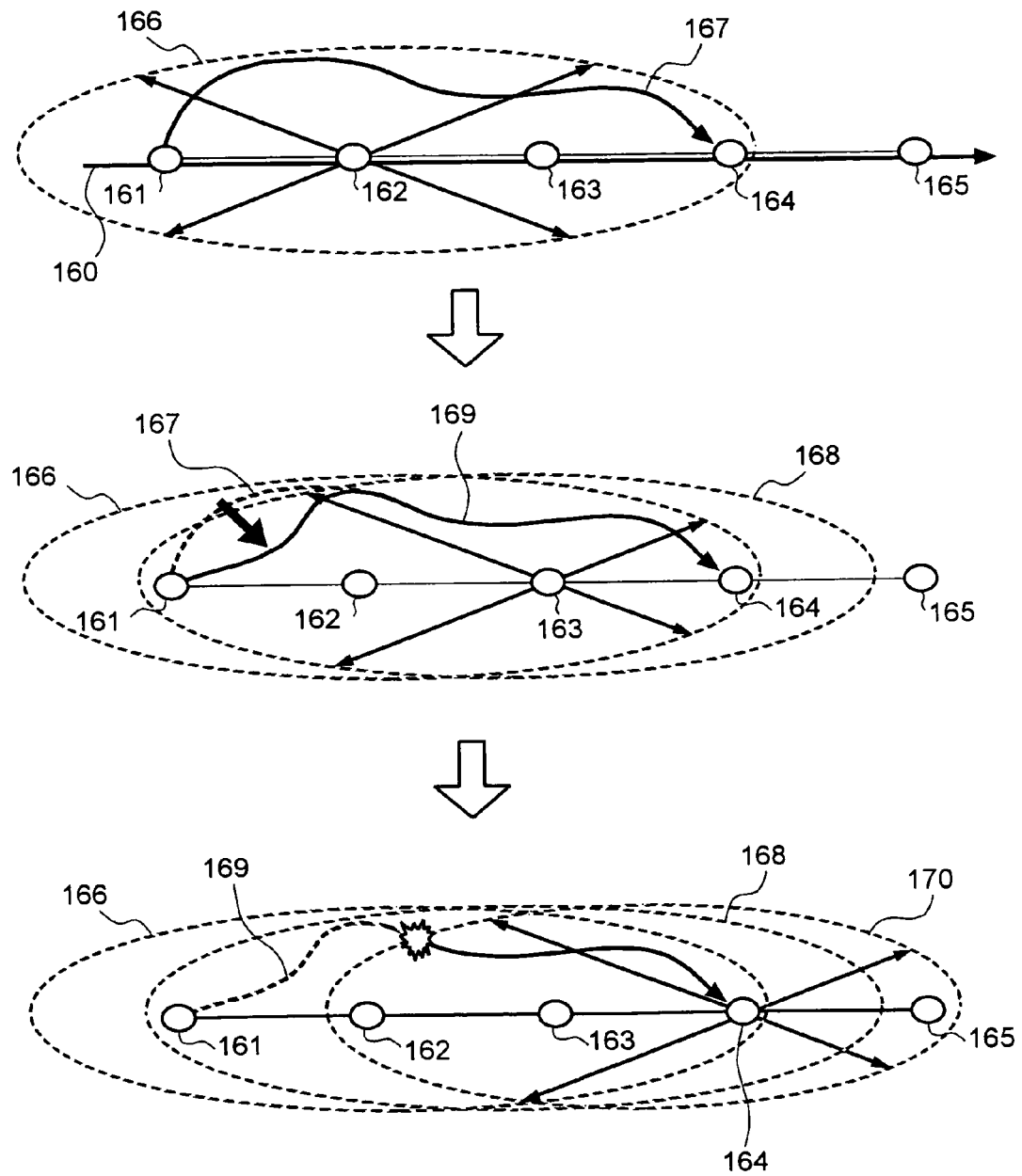
FIG. 14 is a schematic to explain a segment setting processing according to the third embodiment.

First, a segment setting processing according to the fourth embodiment will be explained. FIG. 14 is a schematic to explain the segment setting processing according to the fourth embodiment. As explained in FIG. 14, in the segment setting processing, first a failure notification area 166 containing the communication nodes where the time for transferring a failure notification message from a failure detected communication node 162 on an active communication path 160 to be protected is within a predetermined time is obtained, and the communication nodes contained in the failure notification area 166 are used to search for a backup communication path 167.

A failure notification area 168 containing the communication nodes where the time for transferring a failure notification message from a failure detected communication node 163 adjacent to the failure detected communication node 162 is within a predetermined time is obtained, and the communication nodes commonly contained in the failure notification areas 166 and 168 are used to search for the backup communication path which bypasses the failures detected by the failure notification nodes 162 and 163.

When the backup communication path has been successfully searched for, a searched backup communication path 169 is set as a new backup communication path. A failure notification area 170 of a failure detected communication node 164 adjacent to the failure detected communication node 163 is further obtained, and the communication nodes commonly contained in the failure notification areas 166, 168, and 170 are used to search for the backup communication path which bypasses each failure detected by the failure notification nodes 162, 163, and 164.

When the backup communication path which bypasses each failure has not been searched for successfully, the backup communication path 169 is set as a segment capable of bypassing a failure in a section of the active communication path sandwiched by the communication node 161 and the failure detected communication node 164.

Thereafter, when the section of the active communication path sandwiched by the failure detected communication nodes 164 and 165 is a section to be protected, a processing similar to the processing is repeated and a new segment is set as needed.

Figure 15:
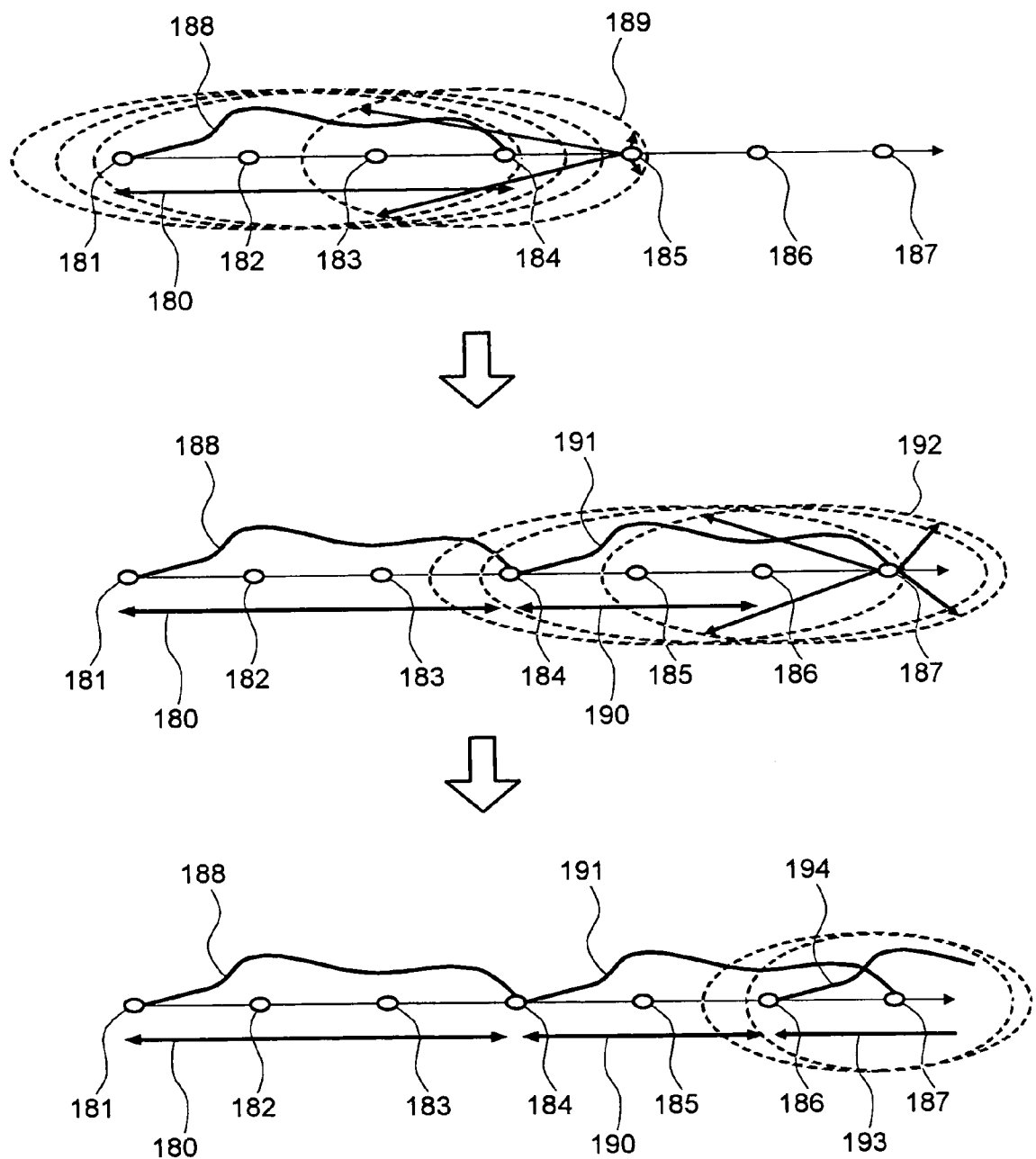
FIG. 15 is a schematic to explain a segment setting processing in which communication links are to be protected.

A failure which is bypassed by the processing may be any failure which occurs in the communication link or in the communication node. FIG. 15 is a schematic to explain a segment setting processing which is to protect the communication link, and FIG. 16 is a schematic to explain a segment setting processing which is to protect the communication node.

FIG. 15 explains a state where when the communication link of the active communication path having communication nodes 181 to 187 is to be protected, a segment 188 of the backup communication path which bypasses the failures in the communication link detected by the failure detected communication nodes 182, 183, and 184 (a communication link failure between the failure detected communication nodes 181 and 182, a communication link failure between the failure detected communication nodes 182 and 183, and a communication link failure between the failure detected communication nodes 183 and 184) is searched for.

Since the communication nodes commonly contained in a failure notification area 189 of the failure detected communication node 185 and each failure notification area of the failure detected communication nodes 182, 183, and 184 cannot construct the backup communication path which bypasses the communication link failures detected by the failure detected communication nodes 182, 183, 184, and 185, the segment 188 of the backup communication path protects the communication link failures in the section 180 sandwiched by the communication node 181 and the failure detected communication node 184.

There is explained a state where a segment 191 of the backup communication path which bypasses the communication link failures detected by the failure detected communication nodes 185 and 186 (a communication link failure between the failure detected communication nodes 184 and 185 and a communication link failure between the failure detected communication nodes 185 and 186) is searched for.

Since the communication nodes commonly contained in a failure notification area 192 of the failure detected communication node 187 and the failure notification areas of the failure detected communication nodes 185 and 186 cannot construct the backup communication path which bypasses the failures detected by the failure detected communication nodes 185, 186, and 187, the second segment 191 of the backup communication path protects the communication link failures in a section 190 sandwiched by the failure detected communication node 184 and the failure detected communication node 186.

Thereafter, a new segment 194 of the backup communication path which protects the communication link constructed by the failure detected communication nodes 186 and 187 and the like (which protects the communication link failures in a section 193) is similarly searched for.

Each segment is set to protect the communication link of the active communication path to be protected without being overlapped with other segment like the segment 188 and the segment 191 of the backup communication path shown in FIG. 15 so that the communication resources can be utilized efficiently to cope with the communication link failures.

FIG. 16 explains a state where when communication nodes 202 to 207 on the active communication path are to be protected, a segment 208 of the backup communication path which bypasses the failures of the communication nodes 202 and 203 detected by the failure detected communication nodes 202 and 203 is searched for.

Since the communication nodes commonly contained in a failure notification area 209 of the failure detected communication node 204 and the failure notification areas of the failure detected communication nodes 202 and 203 cannot construct the backup communication path which bypasses the communication node failures detected by the failure detected communication nodes 202, 203, and 204, the segment 208 of the backup communication path is assumed to be an area 200 constructed by the failure detected communication nodes 202 and 203.

A segment 211 of the backup communication path which bypasses the failures of the communication nodes 204 and 205 detected by the failure detected communication nodes 204 and 205 is searched for.

Since the communication nodes commonly contained in a failure notification area 212 of the failure detected communication node 206 and the failure notification areas of the failure detected communication nodes 204 and 205 cannot construct the backup communication path which bypasses the communication node failures detected by the failure detected communication nodes 204, 205, and 206, the segment 211 of the backup communication path is to be an area 210 constructed by the failure detected communication node 204 and the failure detected communication node 205. In the following, a new segment 214 of the backup communication path which protects the communication nodes such as the failure detected communication nodes 206 and 207 (which protects the communication failure in an area 213) is similarly searched for.

Each segment is set such that the start or end communication node of each segment on the backup communication path is protected by other segment like the segment 208 and the segment 211 of the backup communication path shown in FIG. 16, and the segment 211 and the segment 214, thereby the communication node failures can be accurately coped with.

Although searching for the backup communication path is begun from the start communication node of the active communication path to be protected in the structures shown in FIGS. 15 and 16, searching for the backup communication path may be begun from the end communication node of the active communication path. Alternatively, searching for the backup communication path may be begun from both the start communication node and the end communication node of the active communication path.

The functional structure of the management communication node according to the fourth embodiment is almost similar to the functional structure of the management communication node 60 according to the first embodiment shown in FIG. 2. However, the backup communication path information stored in the storage unit according to the fourth embodiment stores the information on the backup communication path divided into each segment.

The communication node selecting unit according to the fourth embodiment selects the communication node commonly contained in the failure notification area of each failure detection node as explained using FIG. 15 or FIG. 16, and the backup communication path designing unit according to the fourth embodiment uses the communication nodes selected by the communication node selecting unit to divide into segments and retrieve for the backup communication path which bypasses a plurality of failures on the active communication path to be protected.

Thereafter, in order to discriminate each of the functioning units from the functioning unit in FIG. 2, the numeral of the backup communication path information according to the fourth embodiment is assumed as 67c2, the numeral of the communication node selecting unit according to the fourth embodiment is assumed as 69b, and the numeral of the backup communication path designing unit according to the fourth embodiment is assumed as 70b, and an explanation based thereon will be given. The other functioning units are denoted with like numerals identical to those of the respective functioning units in FIG. 2.

A process procedure of the backup communication path design processing according to the fourth embodiment will be explained. FIG. 17 is a flowchart to explain the process procedure of the backup communication path design processing according to the fourth embodiment. As explained in FIG. 17, the communication node selecting unit 69b first acquires the topology information 67a stored in the storage unit 67 (step S401), and calculates a time for transferring a failure notification message from each communication node on the active communication path to be protected (step S402).

The communication node selecting unit 69b extracts a communication node group where the time for transferring a failure notification message from the failure detected communication node is within a designated time (step S403), and further searches for the backup communication path which is constructed by the communication nodes contained in each extracted node group and conforms to a predetermined reference (step S404). The predetermined reference is a backup communication path design reference such as a minimum bypass distance, a minimum preliminary communication capacity, a maximum distance between the start and end communication nodes, and a minimum distance between the start and end communication nodes.

The communication node selecting unit 69b calculates a time for transferring a failure notification message from the failure detection node adjacent to the failure detection node (step S405), and extracts a communication node group where the time for transferring a failure notification message from the adjacent failure detected communication nodes is within a designated time (step S406).

The backup communication path designing unit 70b uses the communication nodes commonly contained in each extracted communication node group to search for the backup communication path which bypasses each failure detected by each failure detected communication node where the communication node group has been extracted and conforms to the predetermined reference (step S407).

Thereafter, the backup communication path designing unit 70b checks whether or not the backup communication path capable of bypassing each failure has been successfully searched for (step S408). When the backup communication path has been successfully searched for (step S408, Yes), the processing proceeds to step S405, where the communication node selecting unit 69b further calculates the time for transferring a failure notification message from the adjacent communication node and continues the subsequent processing.

When searching for the backup communication path has been failed (step S408, No), the backup communication path designing unit 70b sets the backup communication path which has already been searched for successfully as segments (step S409), and checks whether or not the failure detection node on the active communication path to be protected is further present adjacently (step S410).

When the failure detected communication node on the active communication path to be protected is further present adjacently (step S410, Yes), the processing proceeds to step S402, where the communication node selecting unit 69b calculates the time for transferring a failure notification message from the failure detected communication node, and continues the subsequent processing.

When the failure detected communication node on the active communication path to be protected is not present adjacently (step S410, No), the backup communication path designing unit 70b stores the information on the backup communication path for each segment, which has been searched for successfully, in the backup communication path information 67c2 (step S411). Then, the message processing unit 65 transmits a request of setting the backup communication path to other communication nodes (step S412), and the backup communication path setting processing is terminated.

As explained above, according to the fourth embodiment, the backup communication path designing unit 70b uses the communication nodes selected by the communication node selecting unit 69b to divide the backup communication path into a plurality of segments and search for the backup communication path which bypasses a plurality of failures on the active communication path to be protected. Therefore, even when the failures on the active communication path to be protected cannot be bypassed by one backup communication path, the backup communication path is designed for each segment so that the bypass enable path can be designed.

According to the fourth embodiment, when each segment of the backup communication path is set, the backup communication path designing unit 70b sequentially adds adjacent communication nodes to set a segment where the number of communication nodes between the start communication node and the end communication node in the segment on the backup communication path is the maximum. Therefore, the distance of the segment on the backup communication path is made large so that the backup communication path is easily shared and the communication resources can be restricted.

In the fourth embodiment, since the backup communication path designing unit 70b sequentially adds the adjacent communication nodes from the start communication node on the active communication path to be protected to set the segments, each segment can be set easily and efficiently.

In the fourth embodiment, since the backup communication path designing unit 70b sequentially adds the adjacent communication nodes from the end communication node on the active communication path to be protected to set the segments, each segment can be set easily and efficiently.

In the fourth embodiment, since the backup communication path designing unit 70b sequentially adds the adjacent communication nodes from both the start communication node and the end communication node on the active communication path to be protected to set the segments, each segment can be set easily and efficiently.

In the fourth embodiment, since when the backup communication path for a communication link failure is searched for, the backup communication path designing unit 70b sets a plurality of segments which protect the communication link of the active communication path to be protected without being overlapped with other segment, the communication resources can be efficiently used to cope with the communication link failure.

In the fourth embodiment, since when the backup communication path for a communication node failure is searched for, the backup communication path designing unit 70b sets a plurality of segments where the start or end communication node of each segment on the backup communication path is protected by other segment, the communication node failure can be accurately coped with.

Although the backup communication path is designed by the management communication node in the first to the fourth embodiments, the backup communication path may be designed by a management server that manages the backup communication path. In a fifth embodiment of the present invention, there will be explained a case where the management server that manages the backup communication path designs the backup communication path.

Figure 18A:
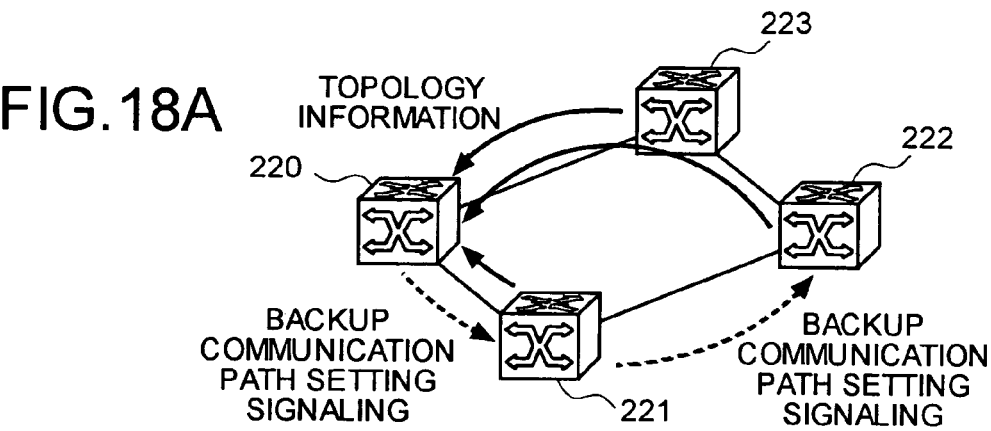
FIG. 18A is a schematic to explain a signaling processing of backup communication path setting which a management communication node performs on other communication nodes.

First, a management system of a backup communication path according to the fifth embodiment will be explained. FIG. 18A is a schematic to explain a backup communication path setting signaling processing which the management communication node performs for other communication nodes, FIG. 18B is a schematic to explain the backup communication path setting signaling processing which the management server performs for other communication nodes, and FIG. 18C is a schematic to explain the backup communication path setting processing which the management server performs for other communication nodes.

FIG. 18A explains a case where a management communication node 220 collects the topology information of each communication node and designs the backup communication path based on the collected topology information as explained in the first to the fourth embodiments. The management communication node 220 performs the backup communication path setting signaling which requests a communication node 221 constructing the backup communication path to set information on the designed backup communication path and the backup communication path as a bypass path to be actually used.

The communication node 221 which has been subjected to the backup communication path setting signaling further performs the backup communication path setting signaling on a communication node 222 constructing the backup communication path. The processing is performed on each communication node constructing the backup communication path so that the backup communication path can be set.

Figure 18B:
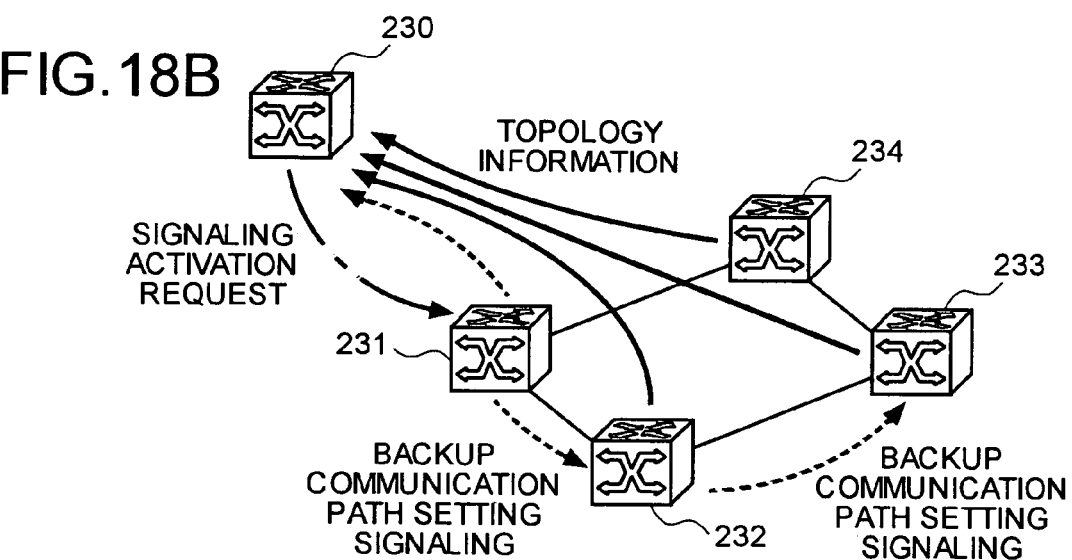
FIG. 18B is a schematic to explain a signaling processing of backup communication path setting which a management server performs on communication nodes.
Figure 18C:
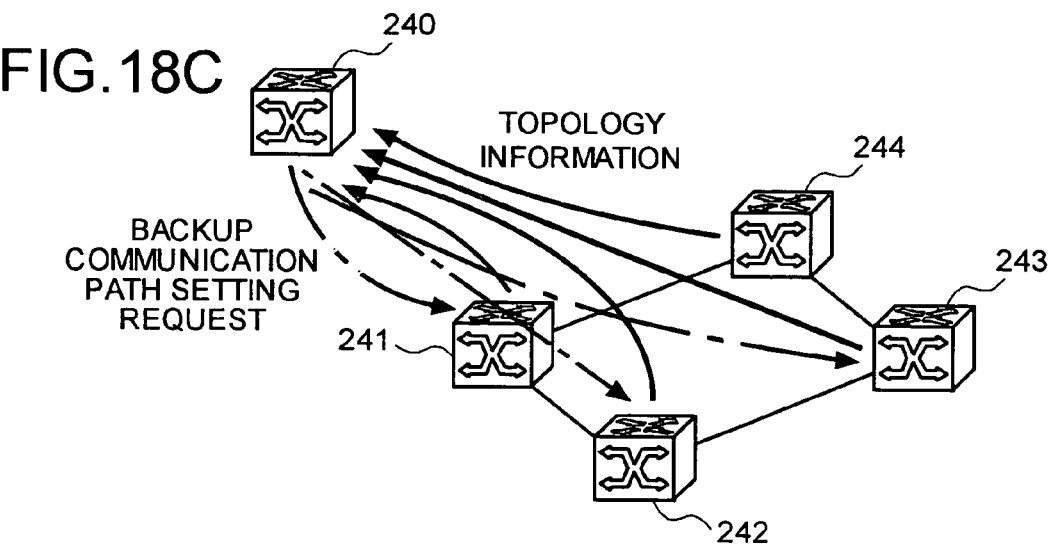
FIG. 18C is a schematic to explain a backup communication path setting processing which the management server performs on communication nodes.

FIG. 18B explains a case where a management server 230 that manages the backup communication path designs the backup communication path based on the topology information collected from each communication node. The management server 230 transmits the information on the designed backup communication path to a communication node 231, and requests the communication node 231 to activate the backup communication path setting signaling which requests each communication node to set the backup communication path as a bypass path to be actually used.

The communication node 231 which has received the request of activating the backup communication path setting signaling performs the backup communication path setting signaling on other communication node 232 constructing the backup communication path. This processing is performed on each communication node constructing the backup communication path so that the backup communication path can be set.

FIG. 18C explains a case where the management server 230 that manages the backup communication path designs the backup communication path based on the topology information collected from each communication node similarly as in FIG. 18B, but FIG. 18C is different in that the management server 230 directly makes a request of setting the backup communication path to each communication node 241 constructing the designed backup communication path.

Figure 19:
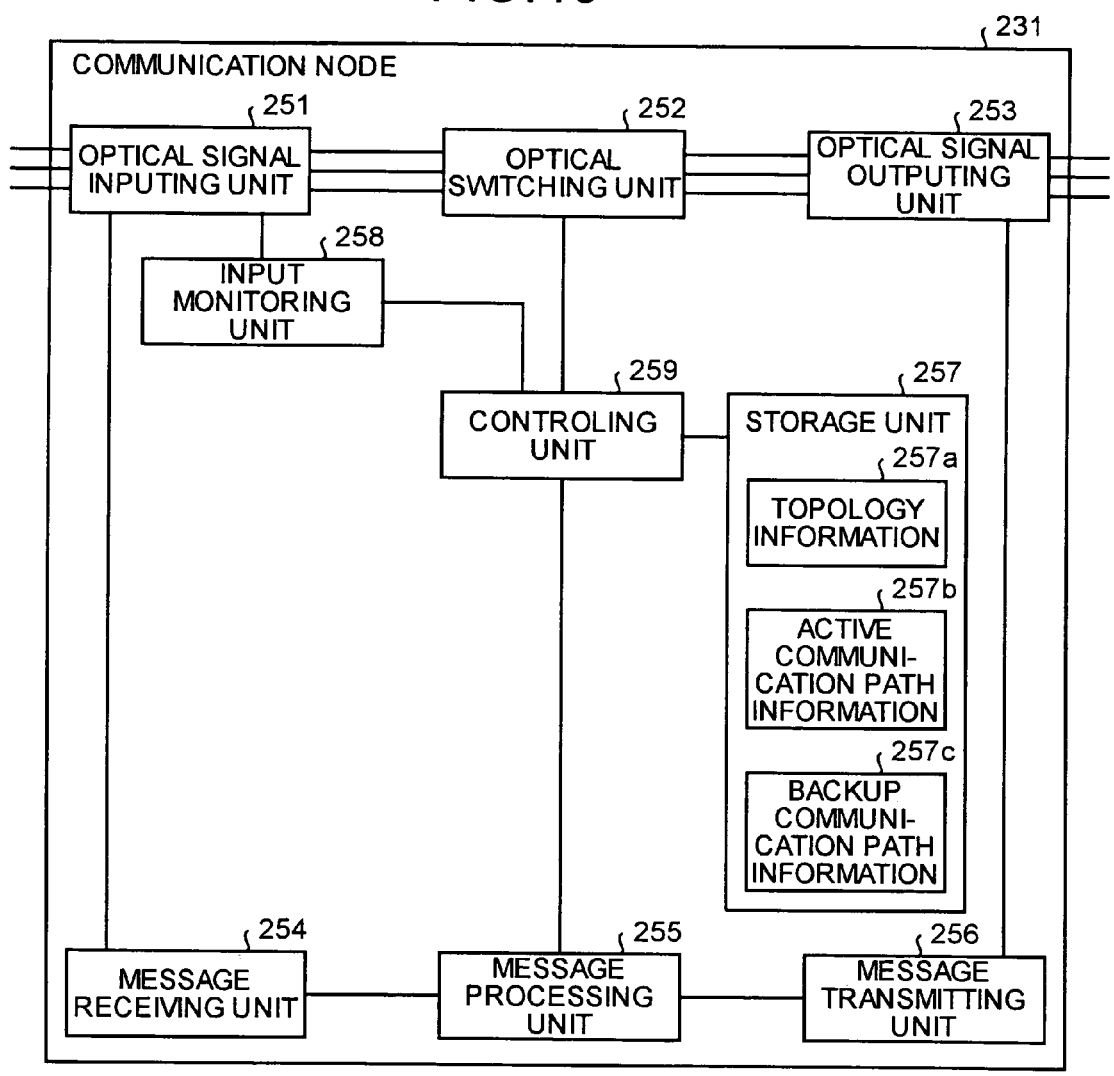
FIG. 19 is a functional block diagram of a communication node according to a fifth embodiment of the present invention.

FIG. 19 is a functional block diagram of the communication node 231 shown in FIG. 18B. As explained in FIG. 19, the communication node 231 has an optical signal inputting unit 251, an optical switching unit 252, an optical signal outputting unit 253, a message receiving unit 254, a message processing unit 255, a message transmitting unit 256, a storage unit 257, an input monitoring unit 258, and a controlling unit 259. A detailed description will be omitted on the functioning units having the same functions as those of the functioning units explained in FIG. 2.

The optical signal inputting unit 251 is a receiving unit that receives an optical signal from an adjacent upstream communication node, and the optical signal outputting unit 253 is an outputting unit that outputs the received optical signal to an adjacent downstream communication node. The optical switching unit 252 is a switching unit that, when a failure occurs on the active communication path and switching to a backup communication path is required in the communication node, switches to the backup communication path.

The message receiving unit 254 is a receiving unit that receives a failure notification message transmitted from an adjacent communication node or a request of activating the backup communication path setting signaling transmitted from the management server 230, and the message transmitting unit 256 is a transmitting unit that transmits a failure notification message to adjacent communication nodes and transmits the topology information on the self-communication node to the management server 230.

The message processing unit 255 is a processing unit that holds a failure notification message received in the message receiving unit 254. The message processing unit 255 retrieves the held failure notification message to determine whether or not a failure notification message newly received by the message receiving unit 254 is overlapped with the already received failure notification message. When the message is the new failure notification message, the message processing unit 255 issues an instruction of transmitting the failure notification message to the message transmitting unit 256.

The message processing unit 255 issues the instruction to the message transmitting unit 256, and then refers to backup communication path information 257c stored in the storage unit 257 and issues an instruction of switching the communication path to the optical switching unit 252. When the input monitoring unit 258 detects a failure of the communication link connected to the optical signal inputting unit 25i, the message processing unit 255 creates a failure notification message containing the information on the failures on the communication link basis and a failure detected communication node (self-communication node), and causes the message transmitting unit 256 to transmit the created failure notification message.

The message processing unit 255 transmits the information on the backup communication path designed by the management server 230 to each communication node, and performs the backup communication path setting signaling which requests the communication nodes constructing the backup communication path to set the backup communication path based on the transmitted backup communication path information. When the backup communication path setting signaling is received from other communication node, the backup communication path is set in the self-communication node, and the backup communication path setting signaling is performed on the adjacent communication nodes which belong to the backup communication path.

The storage unit 257 stores the topology information 257a, active communication path information 257b, and the backup communication path information 257c. The topology information 257a is data in which the topology information of each communication node is stored. The active communication path information 257b is information on the active communication path set on the optical communication network. The backup communication path information 257c is information on the backup communication path designed by the management server 230.

The input monitoring unit 258 is a monitoring unit that monitors a state of an optical signal input into the optical signal inputting unit 251. The controlling unit 259 is a controlling unit that performs the entire control of the communication node 231, and controls transmission/reception of various data between the respective functioning units.

Figure 20:
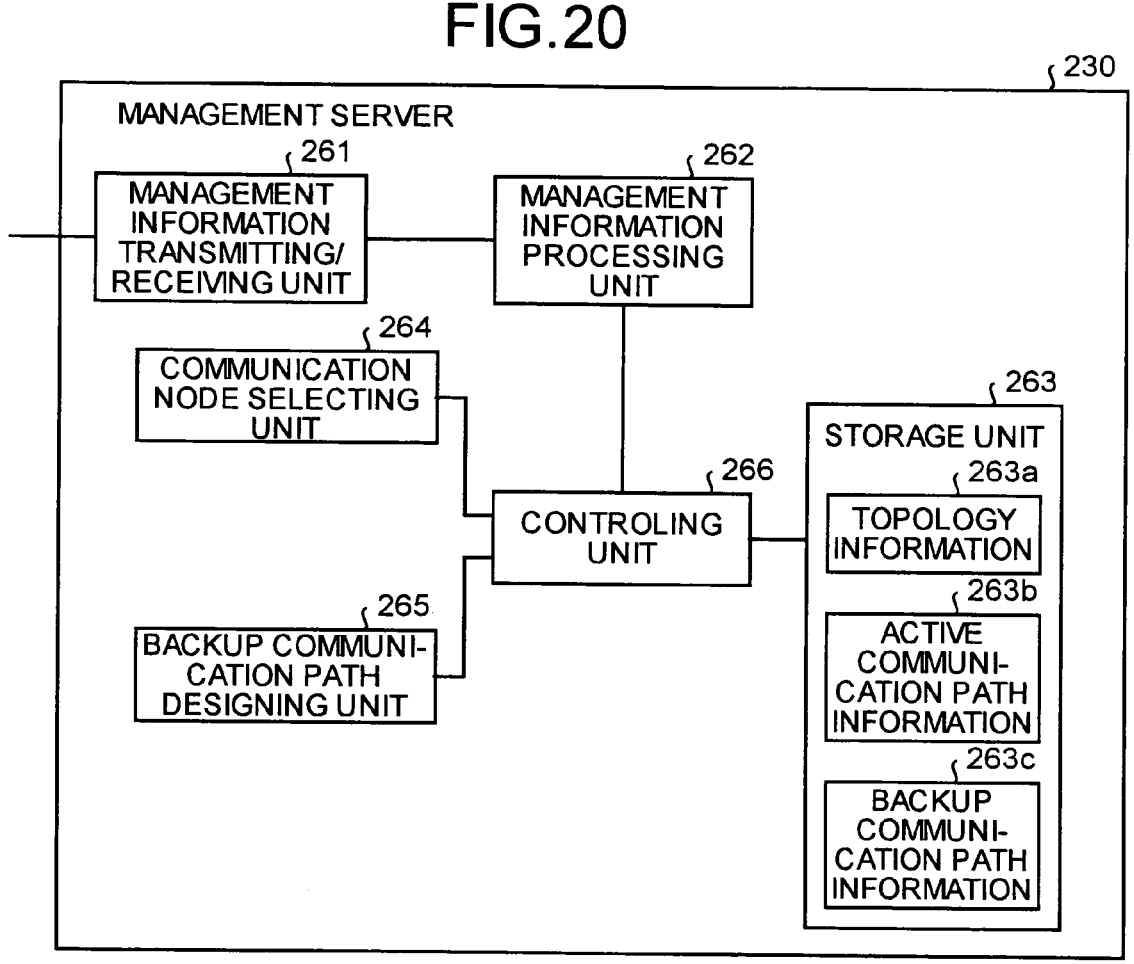
FIG. 20 is a functional block diagram of a management server according to the fifth embodiment.

FIG. 20 is a functional block diagram of the management server 230 shown in FIG. 18B. As explained in FIG. 20, the management server 230 has a management information transmitting/receiving unit 261, a management information processing unit 262, a storage unit 263, a communication node selecting unit 264, a backup communication path designing unit 265, and a controlling unit 266.

The management information transmitting/receiving unit 261 is a transmitting/receiving unit that receives the topology information and the like transmitted from each communication node and transmits the backup communication path information or a request of activating the backup communication path setting signaling to the communication nodes.

The management information processing unit 262 stores the topology information received from each communication node in the storage unit 263 as the topology information 263a. The management information processing unit 262 is a processing unit that instructs the management information transmitting/receiving unit 261 to transmit the information on the backup communication path designed by the backup communication path designing unit 265 and the request of activating the backup communication path setting signaling.

The management information processing unit 262 transmits a message for requesting each communication node to transmit the topology information via the management information transmitting/receiving unit 261, and acquires the correspondingly transmitted topology information to store it in the storage unit 263 as the topology information 263a. The information collecting uses a protocol such as SNMP (Simple Network Management Protocol).

The storage unit 263 is a storage unit that stores the topology information 263a, active communication path information 263b, and backup communication path information 263c. The topology information 263a is data in which the topology information collected from each communication node is stored. The active communication path information 257b is information on the active communication path set on the optical communication network. The backup communication path information 257c is information on the backup communication path designed by the management server 230.

The communication node selecting unit 264 is a selecting unit that selects a communication node on the active communication path to be protected, where the time for transferring a failure notification message from a plurality of failure detected communication nodes which detect the failures is within a predetermined time.

The backup communication path designing unit 265 is a designing unit that uses the communication nodes selected by the communication node selecting unit 264 to design the common backup communication path which bypasses a plurality of failures when the failures occur. The controlling unit 266 is a controlling unit that performs the entire control of the management server 230, and controls transmission/reception of various data between the respective functioning units.

The functional structures of the management server 240 and the communication nodes 241 to 244 shown in FIG. 18C are almost similar to those of the management server 231 and the communication nodes 231 to 234 shown in FIGS. 19 and 20.

The message processing units of the communication nodes 241 to 244 are different from the message processing units 255 of the communication nodes 231 to 234 in that when a request of setting the backup communication path is received from the management server 240 with the information on the backup communication path designed by the management server 240, the information on the backup communication path is stored in the storage unit as the backup communication path information to set the backup communication path.

The management information processing unit of the management server 240 is different from the management information processing unit 262 of the management server 230 in that it instructs the management information processing unit to create the setting information which requests to set the backup communication path based on the information on the backup communication path designed by the backup communication path designing unit of the management server 240 and to transmit it to each communication node belonging to the backup communication path.

As explained above, in the fifth embodiment, the management information processing unit 262 of the management server 230 transmits a request signal for requesting the communication nodes contained in the backup communication path to set the backup communication path based on the information on the backup communication path searched for by the backup communication path designing unit 265, and activates in the communication nodes the path setting signaling which requests to transfer the request signal to adjacent communication nodes of the communication node. Therefore, the backup communication path can be designed by the management server independent of the communication node so that processing loads of the communication nodes can be reduced.

In the fifth embodiment, the management information processing unit of the management server 240 transmits a request signal for requesting each communication node contained in the backup communication path to set the backup communication path based on the information on the backup communication path searched for by the backup communication path designing unit. Therefore, the backup communication path can be designed by the management server independent of the communication node, and the management server directly requests each communication node to set the backup communication path so that processing loads of the communication nodes can be reduced.

Although the control signal communication network where control signals such as failure notification messages are communicated and the user data communication network where user data is communicated are the same communication network in the first to the fifth embodiments, the control signal communication network and the user data communication network may be separate communication networks. In a sixth embodiment of the present invention, there will be explained a case where the control signal communication network and the user data communication network are separate communication networks.

Figure 21:
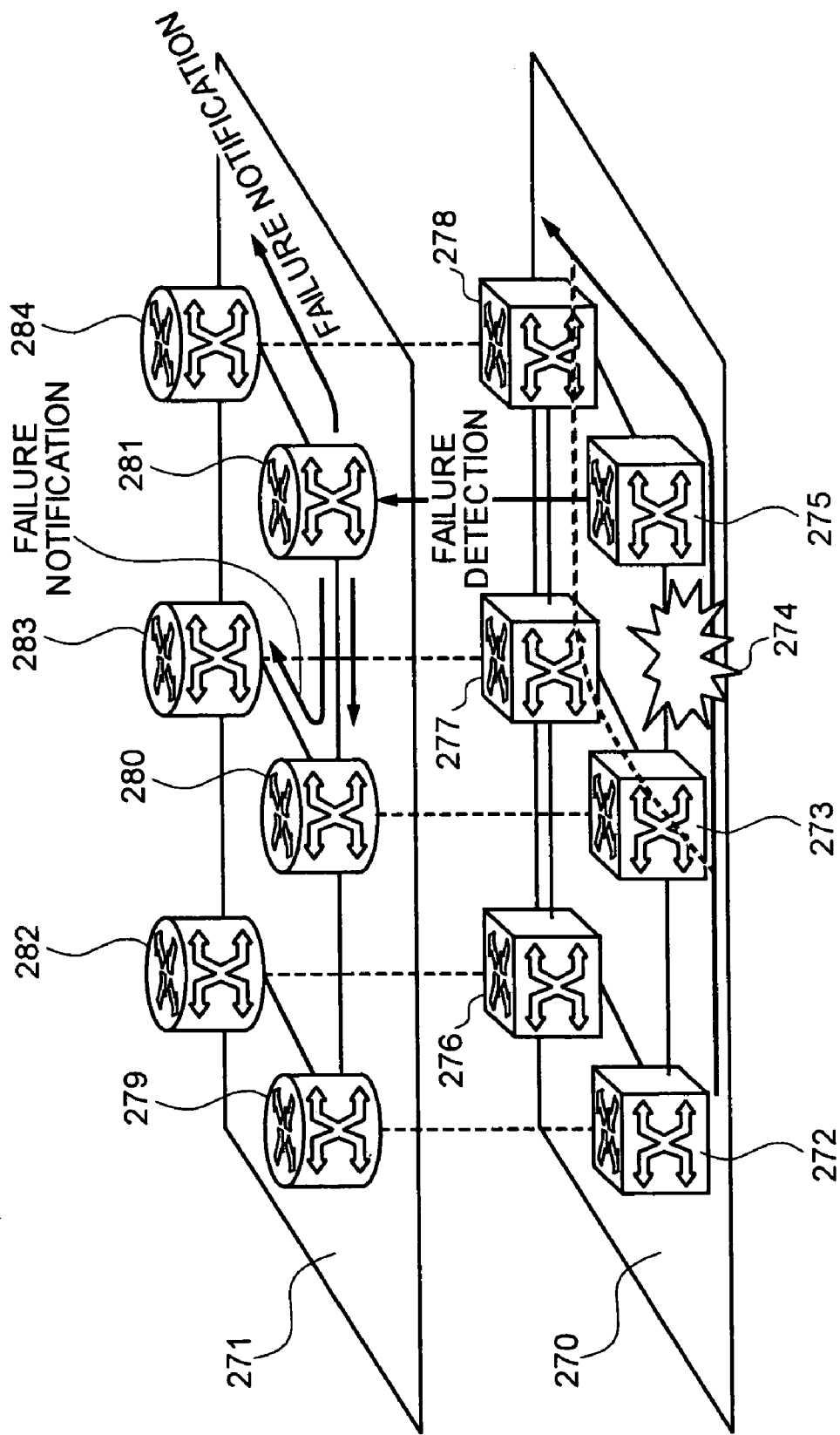
FIG. 21 is a schematic to explain a control signal communication network and a user data communication network according to a sixth embodiment of the present invention.

First, a control signal communication network and a user data communication network according to the sixth embodiment will be explained. FIG. 21 is a schematic to explain the control signal communication network and the user data communication network according to the sixth embodiment.

As explained in FIG. 21, in the communication system, each user data communication node 272 to 278 that communicates user data is connected by a user data communication network 270, and each control signal communication node 279 to 284 that communicates a control signal is connected by a control signal communication network 271.

Each communication link constructing the user data communication network 270 does not necessarily correspond to each communication link constructing the control signal communication network 271. For example, in FIG. 21, a communication link on the control signal communication network 271 corresponding to a communication link connecting the user data communication nodes 276 and 277 is not present.

Also when each communication link constructing the user data communication network 270 corresponds to each communication link constructing the control signal communication network 271, the same communication network may be logically divided into the user data communication network 270 and the control signal communication network 271 to be utilized.

When a failure 274 occurs on the active communication path, a user data communication node 275 which has detected the failure 274 notifies that the failure 274 has been detected to the control signal communication node 281, and the control signal communication node 281 which has received the notification transmits a failure notification message to other adjacent control signal communication nodes by flooding.

In the communication system, when the backup communication path which bypasses a plurality of failures is designed, a control signal communication node group where a time for transferring a failure notification message via the control signal communication network 271 to each control signal communication node is within a designated predetermined time is extracted based on the topology information of the control signal communication network 271 after the failure has been detected by the user data communication node which detects a plurality of failures.

The topology information of the user data communication node group corresponding to the extracted control signal communication node group is used to search for the backup communication path which bypasses a plurality of failures on the user data communication network.

Figure 22:
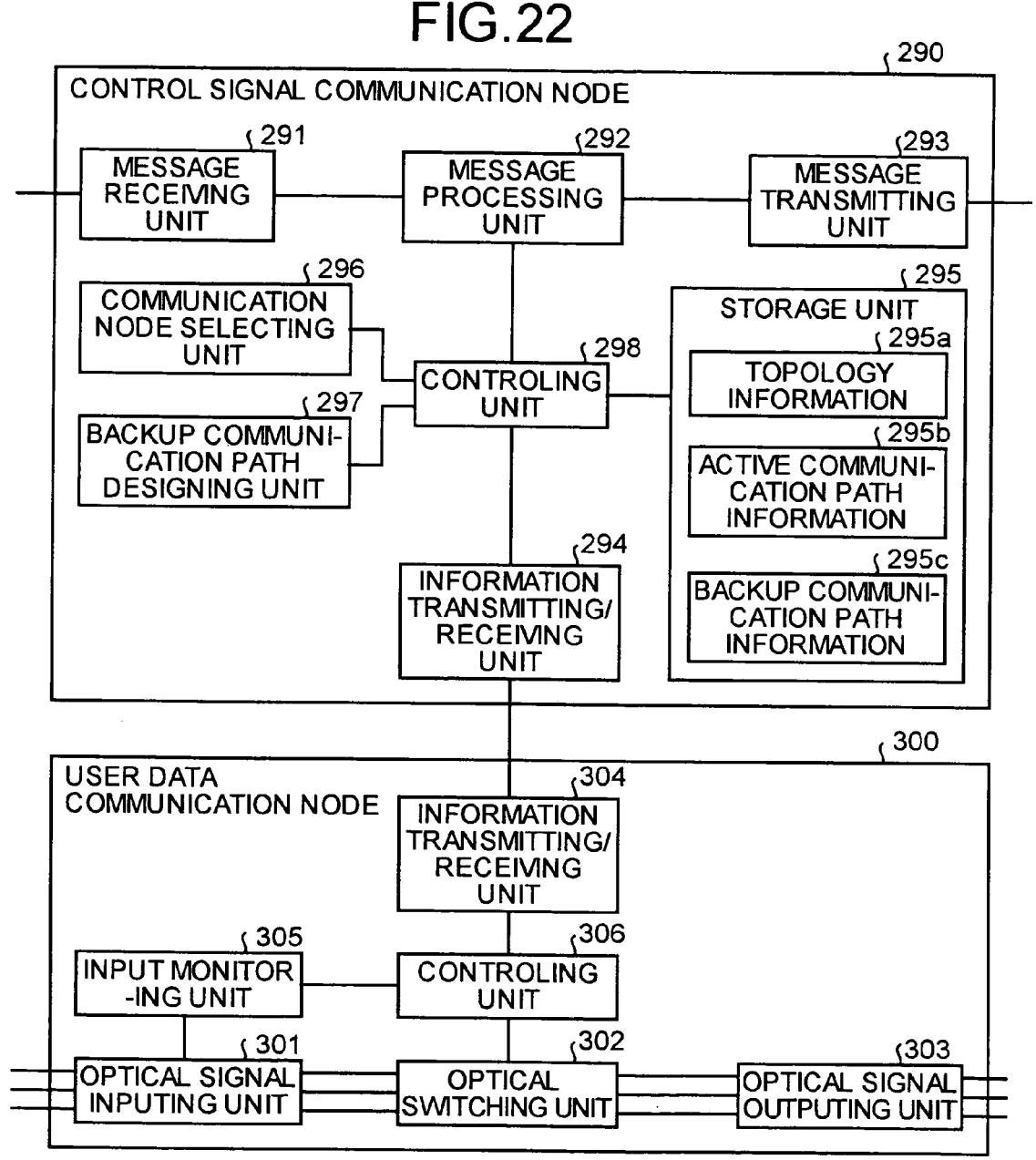
FIG. 22 depicts functional block diagrams of a control signal communication node and a user data communication node according to the sixth embodiment.

The functional structures of the control signal communication node and the user data communication node according to the sixth embodiment will be explained. FIG. 22 is a schematic to explain the functional structures of the control signal communication node and the user data communication node according to the sixth embodiment. The control signal communication node shown in FIG. 22 is a management communication node having a function of designing a backup communication path. The user data communication node 300 is constructed to be connected to a control signal communication node 290 so as to notify the detected failure.

The control signal communication node 290 has a message receiving unit 291, a message processing unit 292, a message transmitting unit 293, an information transmitting/receiving unit 294, a storage unit 295, a communication node selecting unit 296, a backup communication path designing unit 297, and a controlling unit 298.

The message receiving unit 291 is a receiving unit that receives a failure notification message transmitted from the adjacent control signal communication nodes and the backup communication path setting signaling, and the message transmitting unit 293 is a transmitting unit that performs a processing of transmitting a failure notification message to the adjacent control signal communication nodes or a processing of transmitting the topology information on the self-communication node to the control signal communication nodes which design the backup communication path.

The message processing unit 292 is a processing unit that holds the failure notification message received in the message receiving unit 291. The message processing unit 292 retrieves the held failure notification message to determine whether or not a failure notification message newly received by the message receiving unit 291 is overlapped with the already received failure notification message. When the message is the new failure notification message, the message processing unit 292 issues to the message transmitting unit 293 an instruction of transmitting the failure notification message.

The message processing unit 292 issues the instruction to the message transmitting unit 293, and then refers to backup communication path information 295c stored in the storage unit 295 and issues an instruction of switching the communication path to the backup communication path to the optical switching unit 252 of the user data communication node 300 via the information transmitting/receiving unit 294.

When an input monitoring unit 305 of the user data communication node 300 detects a failure on the communication link connected to an optical signal inputting unit 301, the message processing unit 292 creates a failure notification message containing the information on the failure portion on the communication link basis and the user data communication node 300 which has detected the failure, and instructs the message transmitting unit 293 to transmit the created failure notification message.

The message processing unit 292 transmits the information on the backup communication path designed by the backup communication path designing unit 297 to each communication node, and performs the backup communication path setting signaling on the communication nodes constructing the backup communication path so as to set the backup communication path based on the transmitted backup communication path information.

The message processing unit 292 transmits a message for requesting to transmit the topology information to other control signal communication nodes via the message transmitting unit 293, and acquires the correspondingly transmitted topology information to store it in the storage unit 295 as the topology information 295a.

The information transmitting/receiving unit 294 is a transmitting/receiving unit that transmits/receives various information such as failure detection information with the user data communication node 300. The storage unit 295 is a storage unit that stores the topology information 295a, active communication path information 295b, and the backup communication path information 295c.

The topology information 295a is data in which the information on the topology of each control signal communication node and each user data communication node is stored. Specifically, as explained in FIG. 3, the communication link information of each control signal communication node and each user data communication node is stored. Since the user data communication network 270 and the control signal communication network 271 are separated, the topology information 295a stores a table indicating the relationship between the control signal communication node and the user data communication node connected thereto.

The active communication path information 295b is information on the active communication path set on the optical communication network. The backup communication path information 295c is information on the backup communication path designed by the management server 230.

The communication node selecting unit 296 is a selecting unit that selects a control signal communication node where a time for transferring a failure notification message via the control signal communication network constructed by the control signal communication nodes from a plurality of user data communication nodes which detect the failures on the active communication path to be protected is within a predetermined time.

The backup communication path designing unit 297 is a designing unit that uses the user data communication nodes corresponding to the control signal communication nodes selected by the communication node selecting unit 296 to design the backup communication path on the user data communication network which bypasses a plurality of failures when the failures occur. The controlling unit 298 is a controlling unit that performs the entire control of the control signal communication node 290, and controls transmission/reception of various data between the respective functioning units.

The user data communication node 300 has an optical signal inputting unit 301, an optical switching unit 302, an optical signal outputting unit 303, an information transmitting/receiving unit 304, an input monitoring unit 305, and a controlling unit 306.

The optical signal inputting unit 301 is a receiving unit that receives an optical signal from an adjacent upstream communication node, and the optical signal outputting unit 303 is an outputting unit that outputs the received optical signal to an adjacent downstream communication node. The optical switching unit 302 is a switching unit that, when a failure occurs on the active communication path and switching to the backup communication path is required in the communication node, switches to the backup communication path.

The information transmitting/receiving unit 304 is a transmitting/receiving unit that transmits/receives various information such as failure detection information with the control signal communication node 290, and the input monitoring unit 305 is a monitoring unit that monitors a state of an optical signal input in the optical signal inputting unit 301. When a failure in the communication link connected to the optical signal inputting unit 301 is detected, the input monitoring unit 305 notifies that the failure has been detected to the message processing unit 292 of the control signal communication node 290 via the information transmitting/receiving unit 304, and instructs to transmit the failure notification message.

The controlling unit 306 is a controlling unit that performs the entire control of the user data communication node 300, and controls transmission/reception of various data between the respective functioning units.

Although the functional structure of the control signal communication node 290 that designs the backup communication path has been explained, the functional structure of other control signal communication node may employ a functioning unit that designs the backup communication path from the functioning unit of the control signal communication node 290, that is, a functioning unit where the communication node selecting unit 296 and the backup communication path designing unit 297 are excluded.

However, in this case, when the backup communication path setting signaling is received from the other communication node, the message processing unit of the other communication node has a function of setting the backup communication path in the self-communication node and performing the backup communication path setting signaling on the adjacent communication nodes which belong to the backup communication path.

The control signal communication node 290 and the user data communication node 300 are the separate apparatuses here, but the functions of the control signal communication node 290 and the user data communication node 300 can be realized in a single communication node apparatus.

As explained above, in the sixth embodiment, the communication node selecting unit 296 of the control signal communication node 290 selects a control signal communication node where the time for transferring a failure notification message via the control signal communication network 271 that transmits a control signal from a plurality of failures detected communication nodes on the active communication path to be protected is within a predetermined time, and the backup communication path designing unit 297 of the control signal communication node 290 uses the control signal communication nodes selected by the communication node selecting unit 296 to search for the backup communication path of the user data communication network 270 that bypasses a plurality of failures when the failures occur. Even when the communication network that transmits a control signal and the communication path that makes data communication are separate, it is possible to design the backup communication path that recovers the communication within a predetermined recovery time while restricting the communication resources on a plurality of failures in the data communication network.

The embodiments according to the present invention have been explained above with reference to the drawings, but specific structure examples are not limited to the embodiments and design modifications may be included in the present invention within the range without departing from the spirit of the present invention.

For example, although the design processing of the backup communication path that bypasses a plurality of failures is applied to the communication network constructed by optical fiber cables in the first to the sixth embodiments, the present invention is not limited thereto and may be applied to the communication network constructed by other transmission medium such as a metallic (lead wire) cable.

Figure 23:
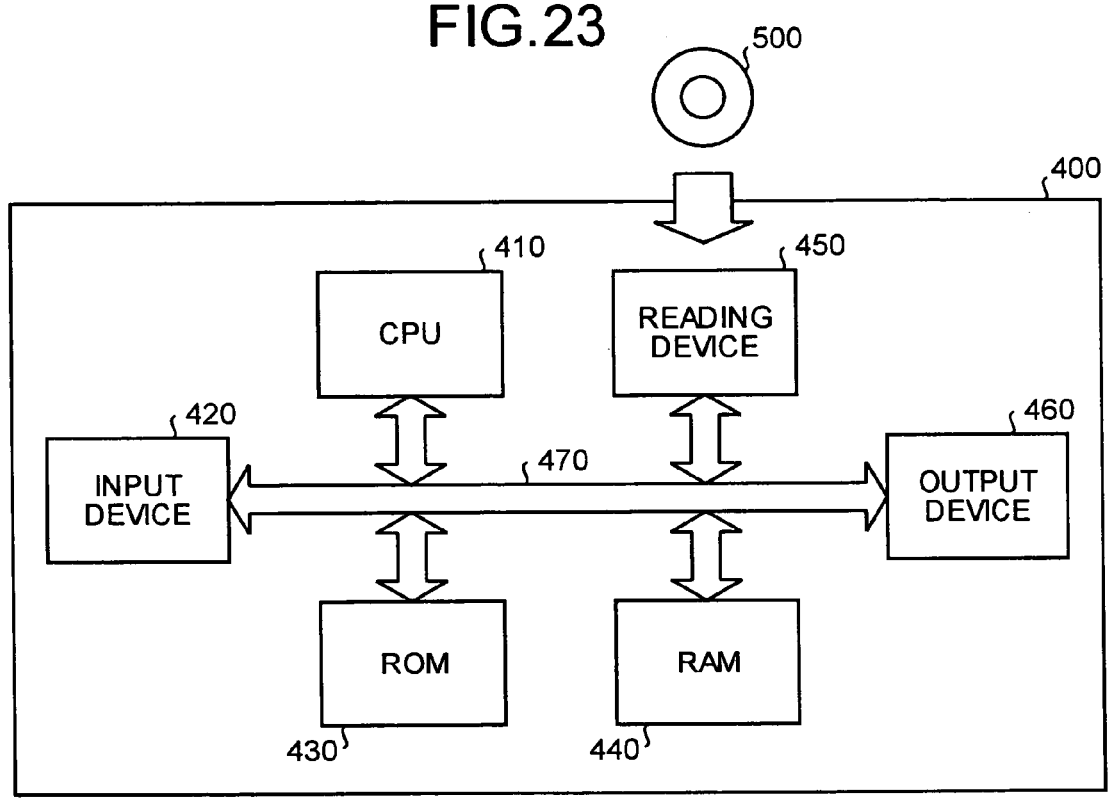
FIG. 23 is a block diagram to explain a structure of a computer according to a variant of the embodiments.
Figure 24:
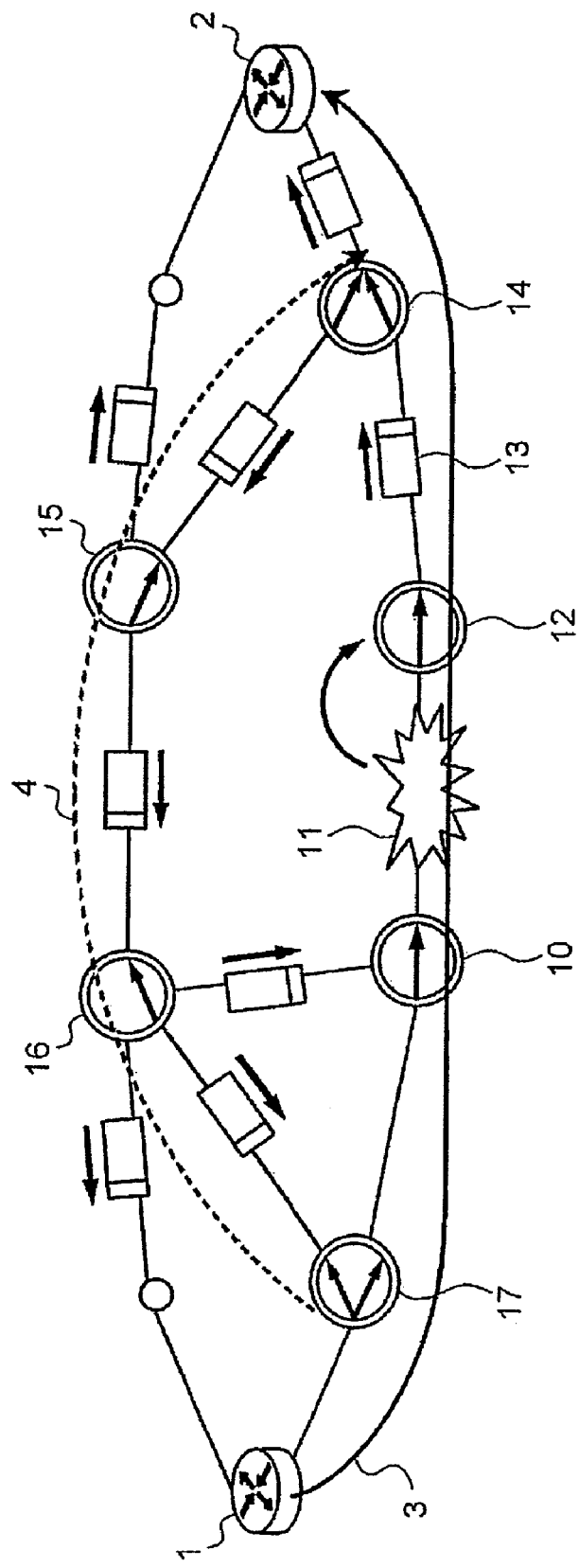
FIG. 24 is a diagram to explain a conventional preplan type failure recovery system.
Figure 25:
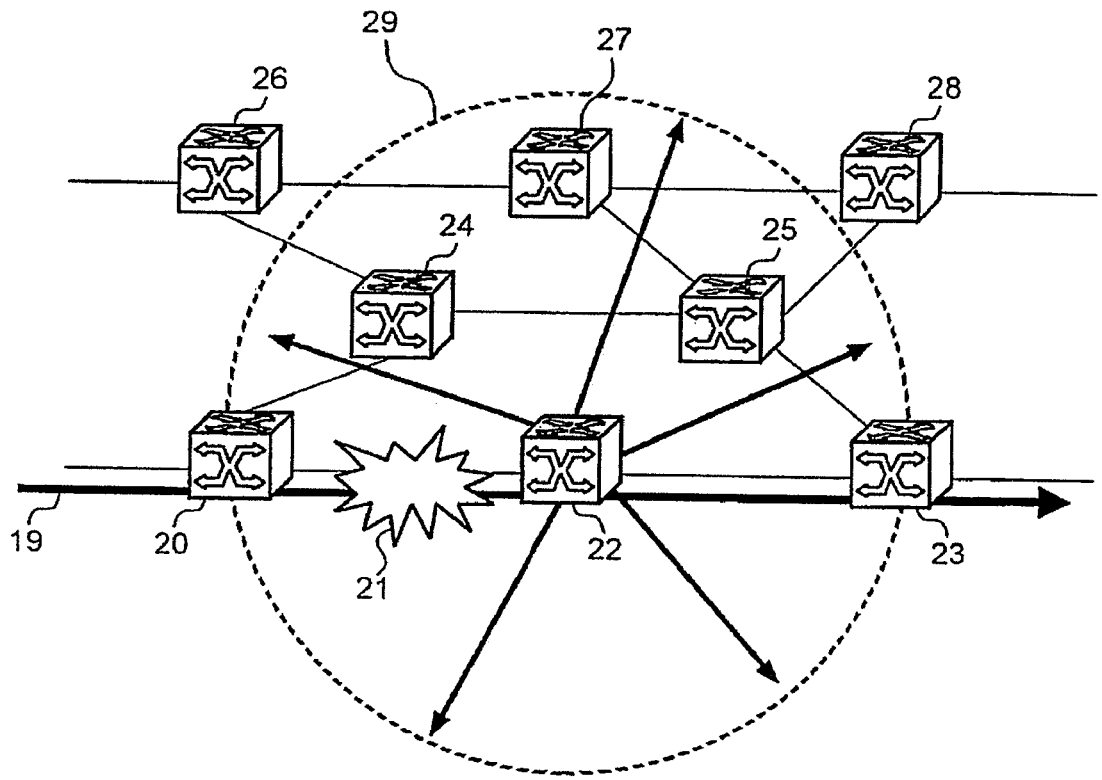
FIG. 25 is a diagram to explain a conventional backup communication path design system.
Figure 26:
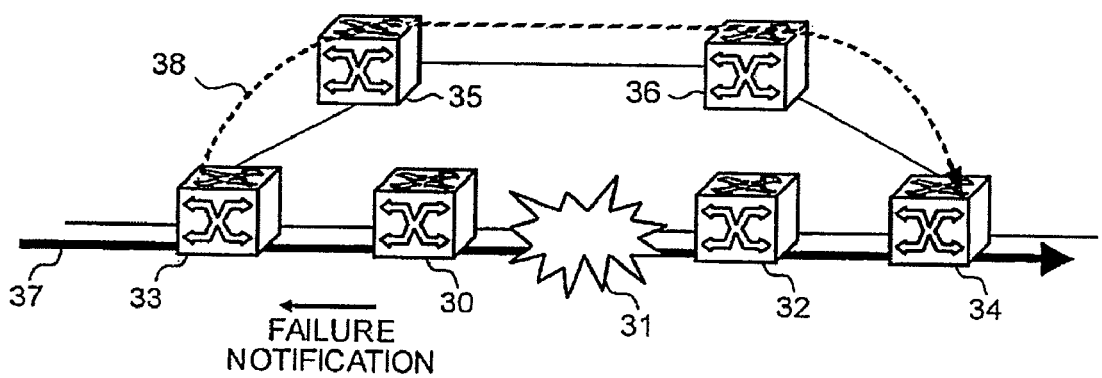
FIG. 26 is a diagram to explain a conventional system of switching to a backup communication path in the MPLS communication network.

A computer program that realizes the functions of the bypass path design apparatus and the bypass path design method is recorded in a computer readable recording medium 500 shown in FIG. 23, and the program recorded in the recording medium 500 may be read and executed by a computer 400 to realize each function of the embodiments.

The computer 400 is constructed by a CPU (Central Processing Unit) 410 that executes the program, an input device 420 such as keyboard or mouse, a ROM (Read Only Memory) 430 that stores various data, a RAM (Random Access Memory) 440 that stores arithmetic parameter, a reading device 450 that reads the program from the recording medium 500, an output device 460 such as a display, and a bus 470 that connects the respective devices.

The CPU 410 reads the program recorded in the recording medium 500 via the reading device 450, and then executes the program to realize the functions. The recording medium 500 may employ an optical disk, a flexible disk, a hard disk, and the like. The program may be introduced into the computer 400 via a network such as the Internet.

According to the present invention, a backup communication path which recovers communication within a predetermined recovery time can be designed while restricting communication resources for the failures on the communication path.

Moreover, a required recovery time can be accurately calculated.

Furthermore, the backup communication path can be easily shared by increasing the distance of the backup communication path to restrict the communication resources.

Moreover, the recovery time can be reduced.

Furthermore, the propagation delay of a signal due to increase in the communication distance can be restricted.

Moreover, the backup communication path which restricts the communication resources can be designed.

Furthermore, the backup communication path which recovers the communication within a predetermined recovery time can be designed while restricting the communication resources for the failures on the communication path even in the communication network composed of the communication links where bidirectional communication is performed.

Moreover, the backup communication path which recovers the communication within a predetermined time can be designed while restricting the communication resources for the failures on the communication path even in the backup communication path switching system such as the MPLS communication network.

Moreover, the backup communication path is designed for each segment so that the bypass enable path can be designed even when the failures on the active communication path to be protected cannot be bypassed by a single backup communication path.

Furthermore, the backup communication path is easily shared by increasing the distance of the segment in the backup communication path and the communication resources can be restricted.

Moreover, each segment can be set easily and efficiently.

Furthermore, the communication resources can be used efficiently to cope with the communication link failure.

Moreover, it is advantageous that the communication node failure can be accurately coped with.

Furthermore, the backup communication path which recovers the communication within a predetermined recovery time can be designed while restricting the communication resources for the failures on the data communication path even when the communication network that transmits a control signal and the communication network that makes data communication are separate.

Moreover, that the backup communication path is designed by the communication node itself and the backup communication path can be set in other communication node.

Furthermore, the backup communication path can be designed by the management server independent of the communication node and processing loads of the communication node can be reduced.

Moreover, the backup communication path can be designed by the management server independent of the communication node and that the management server directly requests each communication node to set the backup communication path so that the processing load of the communication node can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A backup communication path design method in which backup communication path information is previously registered in each communication node of a communication network having a plurality of communication nodes, when a communication link failure or communication node failure occurs, a failure-detected communication node transmits a failure notification message containing failure portion information to the each communication node and a communication node which has received the failure notification message set up a backup communication path in parallel, comprising:
    selecting first communication nodes which receive the failure notification message sent by second communication nodes on a segment of an active communication path to be protected within a predetermined time which satisfies required recovery time; and
    searching for a backup communication path that bypasses the failures on the segment, whose starting node, intermediate node and ending node are selected among the first communication nodes.

2. The method according to claim 1, wherein the selecting includes calculating a time for transferring a failure notification message based on a propagation delay time when the transferred failure notification message passes through a communication link and a time for which the transferred failure notification message is input/output in each communication node.

3. The method according to claim 1, wherein the searching includes searching for, using the communication nodes selected, a backup communication path where a distance between a start communication node and an end communication node on the active communication path is maximum.

4. The method according to claim 1, wherein the searching includes searching for, using the communication nodes selected, a backup communication path where a distance between a start communication node and an end communication node on the active communication path is minimum.

5. The method according to claim 1, wherein the searching includes searching for a backup communication path where a distance to be bypassed is minimum.

6. The method according to claim 1, wherein the searching includes searching for a backup communication path where a preliminary communication capacity saved for failure bypassing is minimum.

7. The method according to claim 1, wherein the selecting includes extracting a communication node where a time for transferring the failure notification message from any one of a plurality of failure-detected communication nodes that detect a single failure on an active communication path to be protected is within a predetermined time for each failure, and selecting a communication node contained in the communication nodes extracted for each failure.

8. The method according to claim 1, wherein the searching includes searching for the backup communication path which bypasses the failures on an active communication path to be protected using the communication node selected by dividing the backup communication path into a plurality of segments.

9. The method according to claim 8, wherein the searching includes, when setting each segment of the backup communication path, adding adjacent communication nodes to set a segment where the number of communication nodes between a start communication node and an end communication node in the segment on the backup communication path is maximum.

10. The method according to claim 9, wherein the searching includes sequentially adding adjacent communication nodes from the start communication node on the active communication path to be protected to set the segments.

11. The method according to claim 9, wherein the searching includes sequentially adding adjacent communication nodes from the end communication node on the active communication path to be protected to set the segments.

12. The method according to claim 9, wherein the searching includes sequentially adding adjacent communication nodes from both the start communication node and the end communication node on the active communication path to be protected to set the segments.

13. The method according to claim 9, wherein the searching includes, when a backup communication path for a communication link failure is searched for, setting a plurality of segments such that a communication link on an active communication path to be protected is not overlapped with other segment.

14. The method according to claim 9, wherein the searching includes, when a backup communication path for a communication node failure is searched for, setting a plurality of segments where any one of the start communication node and the end communication node in each segment on the backup communication path is protected by other segment.

15. The method according to claim 1, wherein the selecting includes selecting a communication node where a time for transferring the failure notification message via a control signal communication path that transmits a control signal from a plurality of failure-detected communication nodes on an active communication path to be protected is within a predetermined time, and the searching includes searching, using the communication nodes selected, for a backup communication path of a data communication path which bypasses a plurality of failures when the failures occur.

16. A backup communication path design method for a communication network having a plurality of communication nodes, wherein backup communication path information is in advance registered in each communication node of the communication network, and when a communication link failure or communication node failure occurs, a failure-detected communication node transmits a failure notification message containing failure portion information to each communication node and a communication node which has received the failure notification message set up a backup communication path in parallel, comprising:

selecting first communication nodes on an active communication path which receives the failure notification message sent by all second communication nodes on a segment of the active communication path to be protected within a predetermined time which satisfies required recovery time; and searching, for a backup communication path that bypasses the failures on the segment, whose starting node is selected among the first communication nodes.

17. A backup communication path design apparatus in which backup communication path information is previously registered in each communication node of a communication network having a plurality of communication nodes, when a communication link failure or communication node failure occurs, a communication node transmits a failure notification message containing failure portion information to the each communication node and a communication node which has received the failure notification message set up a backup communication path in parallel, comprising:

a selecting unit that selects first communication nodes which receive the failure notification message sent by second communication nodes on a segment of an active communication path to be protected within a predetermined time which satisfies required recovery time; and a searching unit that searches for a backup communication path that bypasses the failures on the segment, whose starting node, intermediate node and ending node are selected among the first communication nodes.

18. The apparatus according to claim 17, further comprising a path setting signaling unit that transmits a request signal for requesting to set a backup communication path to communication nodes contained in the backup communication path based on information on the backup communication path searched for by the searching unit and performs path setting signaling for requesting to transfer the request signal to adjacent communication nodes of the communication node, wherein the apparatus performs a function, as a communication node, of relaying the communication.

19. The apparatus according to claim 17, further comprising a path setting signaling activating unit that transmits a request signal for requesting to set a backup communication path to communication nodes contained in a backup communication path based on information on the backup communication path searched for by the searching unit and activates path setting signaling for requesting to transfer the request signal to adjacent communication nodes of the communication node in communication nodes, wherein the apparatus performs a function, as a management server, of managing information on the backup communication path set in communication nodes.

20. The apparatus according to claim 17, further comprising a path setting unit that transmits a request signal for requesting to set a backup communication path in each communication node contained in a backup communication path based on information on the backup communication path searched for by the searching unit, and a function, as a management server, of managing information on the backup communication path set in communication nodes.

21. A non-transitory computer readable recording medium having recorded thereon a computer program for realizing on a computer a backup communication path design method in which backup communication path information is previously registered in each communication node of a communication network having a plurality of communication nodes, when a communication link failure or communication node failure occurs, a failure-detected communication node transmits a failure notification message containing failure portion information to the each communication node and a communication node which has received the failure notification message set up a backup communication path in parallel, the computer program executing steps of:

selecting first communication nodes which receive the failure notification message sent by second communication nodes on a segment of an active communication path to be protected within a predetermined time which satisfies required recovery time; and searching for a backup communication path that bypasses the failures on the segment, whose starting node, intermediate node and ending node are selected among the first communication nodes.

* * * * *